(12) United States Patent
Geil

(10) Patent No.: US 9,728,965 B2
(45) Date of Patent: Aug. 8, 2017

(54) SCALABLE UNIVERSAL POWER SUPPLY AND POWER CONVERTER

(71) Applicant: U.S. Army Research Laboratory ATTN: RDRL-LOC-I, Adelphi, MD (US)

(72) Inventor: Bruce R. Geil, Cooksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 72 days.

(21) Appl. No.: 14/500,281

(22) Filed: Sep. 29, 2014

(65) Prior Publication Data

US 2016/0094152 A1 Mar. 31, 2016

(51) Int. Cl.
*H02J 1/10* (2006.01)
*H02J 3/14* (2006.01)
*H02M 7/48* (2007.01)
*H02M 1/00* (2006.01)
*H01R 29/00* (2006.01)

(52) U.S. Cl.
CPC ............. *H02J 3/14* (2013.01); *H01R 29/00* (2013.01); *H02M 7/48* (2013.01); *H02M 2001/008* (2013.01)

(58) Field of Classification Search
CPC .... H02J 1/10; H02J 1/102; H02J 3/14; H01H 9/061; B23K 11/248; F16P 3/20; H02H 11/00; H02M 11/00; H02M 7/003; H02R 13/6675; H02K 11/046

USPC ....... 307/19, 38, 82, 126, 29, 112, 113, 125; 363/142, 144, 145, 146
See application file for complete search history.

(56) References Cited

U.S. PATENT DOCUMENTS

| 6,212,088 B1* | 4/2001 | Yoo ........................... H02J 1/00 363/146 |
| 7,786,618 B2* | 8/2010 | Cohen ....................... G06F 1/30 307/65 |

(Continued)

OTHER PUBLICATIONS

"NEMA connector" entry on Wikepedia. Available on-line at: http://en.wikipedia.org/wiki/NEMA_connector ("This page was last modified on Sep. 20, 2014 at 15:38.").

(Continued)

*Primary Examiner* — Nguyen Tran
(74) *Attorney, Agent, or Firm* — Eric Brett Compton

(57) ABSTRACT

A scalable universal power supply and/or power converter provides independent voltage, frequency, phase, and current control through a common power bus connected to a plurality of electrical conversion modules which can provide voltage, frequency, phase, and current control. According to one embodiment, a power supply and/or power converter includes a power bus; a plurality of terminals for input and/or output of electricity; a plurality of electrical conversion modules connected in parallel to the bus for transferring or converting electricity; a switch matrix, formed of a plurality of switches arranged in an array, connecting to the plurality of electrical conversion modules and the plurality of terminals; and a controller configured to select and operate one or more electrical conversion modules and one or more switches of the switch matrix to selectively provide and/or receive electricity to the one or more terminals.

29 Claims, 17 Drawing Sheets

(56) References Cited

U.S. PATENT DOCUMENTS

| | | | | |
|---|---|---|---|---|
| 8,604,730 | B2* | 12/2013 | Suzuki | H02M 1/14 318/400.02 |
| 2007/0052296 | A1* | 3/2007 | Gaudreau | H02J 1/10 307/82 |
| 2008/0013351 | A1* | 1/2008 | Alexander | H02M 3/1582 363/123 |
| 2008/0100136 | A1* | 5/2008 | Langlois | H02J 1/10 307/9.1 |
| 2013/0147272 | A1* | 6/2013 | Johnson | H02J 3/36 307/29 |
| 2013/0285460 | A1* | 10/2013 | DeHaven | H02M 3/285 307/82 |
| 2014/0217821 | A1* | 8/2014 | Rozman | H02J 1/14 307/29 |

OTHER PUBLICATIONS

"AC/DC Converters—Rectifiers" DAEnotes. Avaliable on-line at: http://www.daenotes.com/electronics/basic-electronics/ac-dc-converters-rectifiers. (accessed: Aug. 25, 2014).

Blog post titled "DC Motor Speed Controller Using Pulse Width Modulation" posted on the "Homemade Circuit" blog ("Posted on Aug. 27, 2014 by Hamid") Available on-line at: http://www.homemadecircuits.com/blog/2014/08/27/dc-motor-speed-controller-using-pulse-width-modulation/.

Blog post titled "What is a Variable Frequency Drive?" posted on VFDS.com ("Posted by admin in Variable Frequency Drives on Mar. 20, 2014"). Available on-line at: http://www.vfds.com/blog/what-is-a-vfd.

K. Okura, et al. "High Efficiency Operation for H-Bridge DC-DC Converter," 8th International Conference on Power Electronics, Jeju Korea, May 30-Jun. 3, 2011.

Blog post titled "Single Phase Drives—Low Speed Control Mode" posted on the "Modern Power Electronics and Drivers" blog. (blog post dated "Thursday, Dec. 9, 2010"). Available on-line at: http://modernpowerelectronicsanddrivers.blogspot.com/2010/12/single-phase-drives-low-speed-control.html.

J. Bauer, "Single-Phase Pulse Width Modulated Rectifier," Acta Polytechnica vol. 48 No. Mar. 2008.

J. R. Rodriguez et al., "PWM Regenerative Rectifier: State of the Art," IEEE Transactions on Industrial Electronics, vol. 52, No. 1 (2005).

T. F. Podlesak et al., "A 150-kVA Vector-Controlled Matrix Converter Induction Motor Drive," IEEE Transactions on Industry Applications, vol. 41, No. 3, May/Jun. 2005, 841-847.

Ned Mohan, Tore M. Undeland, and William P. Robbins, "Power Electronics: Converters, Applications, and Design," John Wiley & Sons, Inc., 2003, Chapters 7-8.

* cited by examiner

Figure 1A (*Conventional*)

Universal Connector

| Terminals | Power Type |
|---|---|
| (1), 2 | DC |
| (1), 3 | AC (single phase) |
| (1), 2, 3 | AC (2-phase) |
| (1), 2, 3, 4 | AC (3-phase) |

Half H-Bridge ECM

Full H-Bridge ECM

Using two H-Bridge ECMs for DC-DC conversion

SCALABLE UNIVERSAL POWER SUPPLY AND POWER CONVERTER

GOVERNMENT INTEREST

The invention described herein may be manufactured, used and licensed by or for the U.S. Government.

FIELD OF INVENTION

Embodiments of the present invention generally relate to electrical power supplies and power conversion, and more particularly, to a scalable universal power supply and/or power converter.

BACKGROUND

There are four primary parameters that make up any electrical power system: voltage, current, frequency, and phase. Systems that use electrical power require specific values of these parameters that are often quite different at their inputs/outputs, i.e., at the plug. For example, many computer and electronic system include AC-to-DC converters which provide multiple outputs. These converters can handle multiple input voltage and frequencies, but only output a few DC voltages that are preselected or manually-selected by the user.

Recent developments in portable power generation and renewables are providing both the military and commercial sectors the ability to set up small power grids anywhere in the world. A challenge with these small grids is the broad range of load and source electrical requirements. Even a small command outpost with limited loads and sources might be required to handle 2 to 3 different frequencies from DC to 60 Hz AC, voltages from 120 V to 220 V or even 480 V, currents up to 100 A per system, while providing multi-phase power. Additionally, these small outposts have varying power requirements, necessitating a system that can meet these changing demands.

An improved power converter that provides independent voltage, frequency, phase, and current control would be beneficial.

BRIEF SUMMARY OF THE INVENTION

Embodiments of the present invention generally relate to electrical power supplies and/or power converters, and more particularly, to a scalable universal power supply and/or power converter. The scalable universal power supply and/or power converters can provide independent voltage, frequency, phase, and current control through a common power bus connected to a plurality of electrical conversion modules providing voltage, frequency, phase, and current control. This innovative technology and embodiments thereof provide truly scalable universal electrical power conversion capabilities with the ability to output or accept power across a broad range of voltages, frequencies, phases and currents.

According to one embodiment, a power supply and/or power converter comprises: a power bus; a plurality of terminals for input and/or output of electricity; a plurality of electrical conversion modules connected in parallel to the bus for transferring or converting electricity; a switch matrix, formed of a plurality of switches arranged in an array, connecting to the plurality of electrical conversion modules and the plurality of terminals; and a controller configured to select and operate one or more electrical conversion modules and one or more switches of the switch matrix to selectively provide and/or receive electricity to the one or more terminals. The bus may be configured for DC power for most power applications. The electrical conversion modules can be hardwired or removably connected to the bus, for instance. The electrical conversion modules of the power supply and/or power converter may comprise a half-H bridge circuit or full-H-bridge circuit which can be configured to provide: DC-to-AC conversion; DC-to-DC conversion; AC-to-DC conversion and/or AC-to-AC conversion.

Pulse-width modulation (PWM) techniques may be used for these power conversions. For DC-to-AC conversion, the selected electrical conversion modules may be configured as an inverter circuit for receiving DC power and outputting AC power. Here, the voltage, frequency and phase of the one or more selected electrical conversion modules are controlled by the controller which generates control signals to the selected electrical conversion modules using a DC-to-AC PWM control technique. And the PWM control signals are phased shifted based on the number of phases of power required. For DC-to-DC conversion, one or more of the electrical conversion modules may be configured as a buck converter and/or a boost converter for transferring DC power between the bus and one or more terminals. Here, the selected electrical conversion modules are controlled by the controller which generates control signals to the selected electrical conversion modules using an DC-to-DC PWM control technique. For AC-to-DC conversion, one or more of the electrical conversion modules may be configured as a rectifier circuit for receiving AC power and outputting DC power. Here, the selected electrical conversion modules are controlled by the controller which generates control signals to the selected electrical conversion modules using an AC-to-DC PWM control technique. And, for AC-to-AC conversion, one or more of the electrical conversion modules may be configured as a rectifier circuit for receiving AC power and outputting DC power to the bus, and one or more of the electrical conversion modules are configured as an inverter circuit for receiving DC power from the DC bus and outputting AC power using the aforementioned AC-to-DC and DC-to-AC PWM power conversion techniques, respectively.

Additionally, the power supply and/or power converter can be configured to operate in a bypass mode to directly shunt power through the matrix switch between terminals or connectors while avoiding the use of any electrical conversion modules. In some implementations, there are multiple electrical conversion modules provided having multiple, different current ratings. The controller selects electrical conversion modules such that their current ratings sum to at least the required current requirement.

In the power supply and/or power converter embodiments, the electrical conversion modules can connect to rows of the switches in the switch matrix, and the terminals connect to columns of the switches in the switch matrix. More particularly, each of the electrical conversion modules may connects to a different one, of the rows of the switches in the switch matrix, and each of the terminals connects to a different one, of the columns of the switches in the switch matrix, for instance. The switch matrix may be formed of a plurality of switches that are arranged in an interconnected, array, each switch being orthogonally connected to neighboring switches, above and below and side to side, where present, in the switch matrix. In some embodiments, the power converter may further include a power supply connected to the bus for supplying power to the bus.

The controller may be configured to: determine information for requirements of voltage, frequency, phase, current, or some combination thereof for desired power; select which electrical conversion modules are to be used for the desired power; and control the selected electrical conversion modules and one or more switches of the matrix to selectively provide and/or receive electricity to the one or more terminals. In determining information for power requirements, the controller can determine the requirements based on: the load; user-input; and/or pre-determined input and/or output power. More, in selecting which electrical conversion modules to be used for said power, the controller may utilize a rule-based routine. And, in controlling the selected electrical conversion modules and one or more switches of the switch matrix, the controller can utilize a look-up table which maps the terminals to the electrical conversion modules and the switches.

In other embodiments, a modular and scalable power converter system may comprise: a plurality of the aforementioned power supplies and/or power converters being electrically configured to be removably connected for power transfer between them. The power supplies and/or power converters are configured to be connected in various topologies, including ring and linear. At least two of the power supplies and/or power converters can be configured to be remotely connected with a wire, and/or to be connected to one another via plugs or connectors between them.

These and other embodiments are explained in further detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 1A shows some common NEMA plug, connector and receptacle systems which can be used with various embodiments.

FIG. 4A shows an electrical conversion module which is configured as a Half H-bridge circuit, and FIG. 4B shows an electrical conversion module which is configured as a Full H-bridge circuit according to an embodiment.

FIGS. 5A and 5B show a circuit and control operations for a bipolar PWM technique for converting DC-to-AC. FIG. 5C shows one exemplary PWM square-wave switching signal and output AC signal as a function of phase (or time). FIG. 5D shows examples of different AC wave forms generated by this PWM technique.

FIG. 6A shows square-wave PWM control signals of varying duty cycles for stepped-down DC-to-DC voltage conversions. FIG. 6B shows an embodiment for DC-DC conversion using a full H-Bridge electrical conversion module. FIG. 6C shows an another embodiment for DC-to-DC conversion using two half H-Bridge electrical conversion modules.

FIG. 9A shows a bypass for a single load, and FIG. 9B shows a bypass for multiple loads.

FIG. 10 shows a side view of an exemplary power supply and/or power converter. FIG. 10A shows a top view of a ring topology of six power supplies and/or power converters according to an embodiment. FIG. 10B shows a power supply and/or power converter flipped over and connected to other a power supplies and/or power converters in an innovative power converter system.

DESCRIPTION OF THE INVENTION

Figure 1:
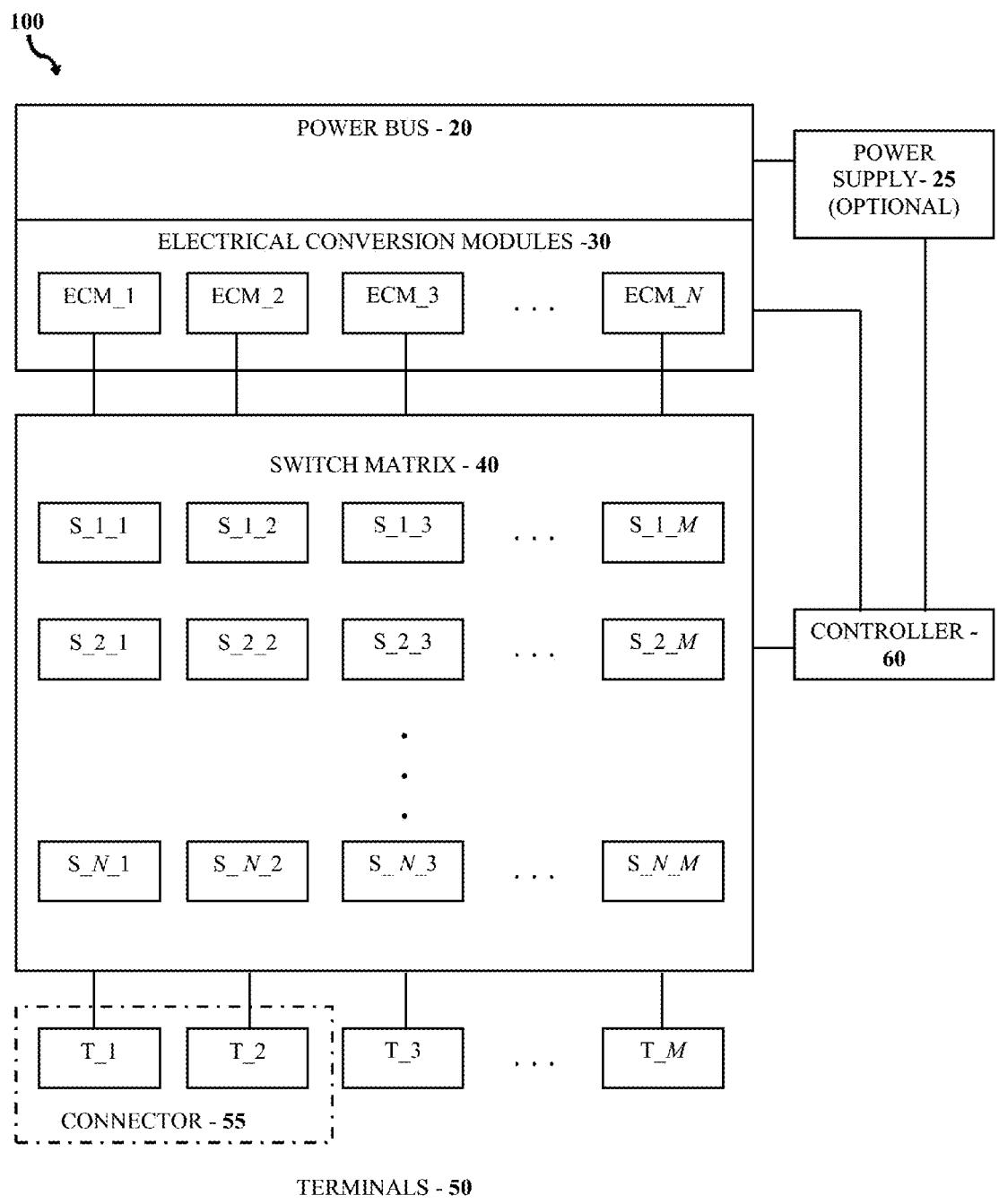
FIG. 1 shows an exemplary architecture for a scalable universal power supply and/or power converter according to an embodiment.

FIG. 1 shows an exemplary architecture for a scalable universal power supply and/or power converter 100 according to an embodiment. For ease of explanation herein, these devices may simply be referred to as the "power converter" since power supplying operations typically use some type of power conversion; although, not all operational modes of the power convertor necessarily result in power conversions. The power converter 100 as shown generally includes a power bus 20, a plurality of electrical conversion modules (ECMs) 30, a switch matrix 40, input/output terminals 50, and a controller 60.

The bus 20 may be a common rail system configured for transfer and distribution of electrical power within the scalable universal power converter 100; although, the bus 20 may be also configured in some implementations to receive and/or transfer power externally. In some embodiments, an optional power supply 25 may be internally included in (or externally associated with) the power converter 100 which connects to the bus 20. For a power bus 20 configured for handling DC power, a power supply 25 may include DC power source or a conventional AC-DC converter providing DC power. If the power converter 100 is installed in a building or vehicle, the power bus 20 power could be supplied externally from the building's and/or vehicle's power supplies. The bus 20 provided a common platform that enables multiple ECMs 30 to be connected together in parallel to provide scalable output power ratings and enable the system to adapt to changing requirements.

Electrical power may be received by and/or transferred to the power bus 20 by (i) the terminals 50 or connectors 55 (via the ECMs 30 and switch matrix 40); (ii) an internal power supply 25; an external power supply (not shown); and/or the bus 20 of another scalable universal power converter 100 connected to the bus 20. The power supply 25 or external power supply might include a power storage device such as a battery, a designated/regulated AC-to-DC voltage supply, a power producing device such as a photovoltaic cell, fuel cell, electrical generator, or the like.

A common rail system of the bus 20 may be comprised of one or more conductors so as to provide DC and/or AC voltage sufficient for the maximum output voltage of the converter 100. For basic DC or AC power requirements, the bus 20 may include at least two parallel rail conductors, such as a positive voltage rail and a ground or negative rail.

Bus voltages will generally be dictated by the input power load. In one embodiment, the bus 20 may be configured for input DC voltage, such as 600 Volt or 300 Volt, 200 A DC power. This would typically be sufficient to produce 480 V AC or 240 V AC power, respectively. One rail of the bus (e.g., the upper rail) can be used for positive DC voltage. The other rail (e.g., the lower rail) can be used for negative or 0 voltage (such as a ground). In other embodiments, this common rail system of the bus 20 would also allow multiple power converter 100 units to be connected together at 22 (FIG. 2) to provide scalable output power ratings and enable the system to expand with changing requirements. This is further discussed below with respect to FIGS. 10, 10A and 10B.

The power converter 100 includes a number N of ECMs 30 which provide current scaling, commonality of parts, and reliability. The electrical conversion modules 30 connect across the bus 20 and their output is connected to the switch matrix 40. The ECMs 30 are configured to provide individual power conversion functions, and can be configured to provide controller reconfiguration of various electrical conversions, including (a) DC-to-AC conversion, (b) DC-to-DC conversion, (c) AC-to-DC conversion, and/or (D) AC-to-AC conversion, as further discussed below. The ECMs 30 allow bi-direction current flow allowing terminal 50 connections to be use for either input from or output to the power bus 20.

While only singular connections are shown here between the controller 60 and the ECMs 30, and the controller 60 and the switch matrix 40, it should be appreciated, that controller 60 is capable of communicating with each ECM 30 and each switch S in the switch matrix 40 for the individual control thereof. Individual conductors, wires, and/or traces may provide discrete pathways between the controller 60 and the each of these elements, for instance.

The ECMs 30 for most power conversion operations may be similarly configured, except for current rating. The ECMs 30 can be hardwired or removably connected to the bus 20. It should be appreciated that using small modular ECMs 30 lowers cost, adds redundancy, allows rapid reconfiguration and replacement, and should reduce I2R losses. To this end, they may have a connector to removably plug into the bus 20 allowing for ease of removal. Each ECM 30 is rated for a given current load. There preferably will be ECMs 30 having multiple, different current ratings which can satisfy various desired current requirements for the power converter 100. For example, a 100 A rated converter 100 might include ten (10) 5 A-rated ECMs, fifteen (15) 2 A-rated ECMs, and twenty (20) 1 A-rated ECMs providing up to 100 A current resolution.

ECMs 30 may be grouped together by current rating, e.g., highest to lowest, along the bus 20. And, by selecting one or more of the ECMs 30 via the controller 60, a desired current requirement for desired power can be achieved. The output from selected ECMs 30 can be selectively routed through the switch matrix 40 connecting the electrical conversion modules 30 and the terminals 50. In particular, the controller 60 selects one or more of ECMs 30 whose current rating sum to at least the required current to be combined together and controls the selected ECMs 30. In some instances, additional 'reserve' ECMs 30 may be provided so as to provide redundancy in the event that other ECM might fail. Additional 'neutral' ECMs 30 may be provided where neutral or ground connections may be required.

The ECMs 30 may be configured as half-H-bridge and/or full-H-bridge circuits as further described below with respect to FIGS. 4A and 4B. If the ECMs are half H-bridge circuit with connected neutral returns they would be effectively function like a full H-bridge. Each ECM 30 may be individually controlled with an electrical drive signal from the controller 60 allowing it to satisfy desired voltage, frequency, phase, and current requirements.

The switch matrix 40 is formed of a plurality of switches S arranged in an array. More particularly, the switch matrix 40 may be arranged in an interconnected, array of switches S, with each switch being orthogonally connected to its neighboring switches, above and below and side to side, where present, in the switch matrix. As shown in FIG. 1, the switch matrix 40 is comprised of an N×M array formed of N rows and M columns of individual switches S. The matrix enables one or more terminals 50 to be coupled to one or more ECMs 30 for individual or group control thereof. The number of rows and columns in the matrix 40 may be greater than what is shown; this permits additional ECMs, terminal and connectors to be later added, if desired. The switches S should generally be equal to or higher in voltage and current rating than the ECM switches that they connect to for safe operation.

Each of the ECMs 30 connects to a different one, of the rows of the switches in the switch matrix 40, and each of the terminals 50 connects to a different one, of the columns of the switches in the switch matrix 40. In the matrix, the switches S may be arranged in groups of columns, with the number of groups corresponding to different connectors 55 (or group of terminals 50) of the electrical power input and/or output. Since the selected ECMs 30 are in parallel the currents thereof will be summed for output (e.g., along columns of the switch matrix 40); thereby enabling grouped ECMs 30 to achieve higher current ratings than individual ECMs. An optimal switch matrix 40 would provide low 'ON' state resistance with low 'OFF' state capacitance and would, if possible, operate at the same switching frequency as the ECMs 30.

The switches S may be solid-state switches, such as transistors (e.g., MOSFETs, IGBTs or the like), or they may be mechanical switching devices, such as relays, for example. Operation of the matrix switches depends on the type of switches used. For slower-operation switches (such as relays), the switch corresponding to the selected ECMs 30 would be engaged followed by initiation of switching. Slow switches may help to better optimize number of ECMs 30 based on load and availability than fast switches in some instances. Also, slow switches can provide reduced conduction losses based on load/source type and reduced processing load. If faster-operation switches are used (such as solid-state transistors which can operate above 10 kHz), then ECMs 30 and matrix switches S could be switched simultaneously. Fast switches may utilize smaller ECMs 30 at low output currents which reduces switch capacitance and therefore switching losses. They can quickly utilize additional parallel ECMs 30 with high output currents to reduce conduction losses. This also allows rapid current increases if required.

In addition, the switch matrix 40 can be controlled so as to directly shunt power when input voltage and frequency is the same as one of the output avoiding the use of any ECMs 30. This may be known as a "bypass" mode and further described below with respect to FIGS. 9A-9B.

Like the ECMs 30, the switch matrix 40 is controlled by the controller 60. In particular, the controller 60 determines and activates one or more of the switches S of switch matrix 40 individually based on the ECMs 30 required and terminals 50 used for desired power. The advantageous use of the switch matrix 40 enables tying any individual or set of ECMs 30 to any particular input(s) or output(s) of the terminals 50.

Terminals 50 can provide both input and/or output of electricity. For example, a user can connect a load or source to however many terminals 50 are needed. Terminals 50 may include various fixed or removable connections, such as plugs, lugs, or the like, hard-wired connections or adapters. A plurality of terminals 50 provides various flexible loads and sources which all may be accommodated by the converter 100. One or more terminals 50 may be grouped into a connector 55. For example, one or more of these connectors 55 of the converter 100 may be provided on its outside housing or at other locations as so desired. The connectors 55 can be adapted to mate with a corresponding plug or corresponding connector as typically found in electrical systems, e.g., the two may have a male-female type engagement or a twist-and-lock engagement, as is typical for most electrical plugs and sockets.

For DC power input or output, a connector 55 might consist of 1 positive terminal and 1 ground or negative terminal. For single-phase AC power, a connector 55 might consist of 1 positive terminal, 1 neutral terminal and 1 ground terminal. For split-phase AC power, a connector 55 might consist of 2 positive terminals, 1 neutral terminal, and 1 ground terminal. And, for 3-phase AC power, a connector 55 might consist of 3 positive terminals, and 1 neutral terminal, and possibly 1 ground terminal. Grounding can be accomplished through an additional pin or through other forms, such as a connection to the case or housing of the the converter 100, for instance. Other connector configurations, of course, are also possible as desired.

FIG. 1A shows some common NEMA plugs, connectors and receptacle systems. These connections have standardized power parameters and terminal configurations. NEMA 5-15 (top left), for instance, is the standard electricity outlet for 120 V AC, 60 Hz electricity found in almost every household and building. Other countries may have their own standards. The connectors 55 and terminal configuration of the converter 100 can be configured for use with these NEMA and/or other standardized connector and receptacle types.

Figure 1B:
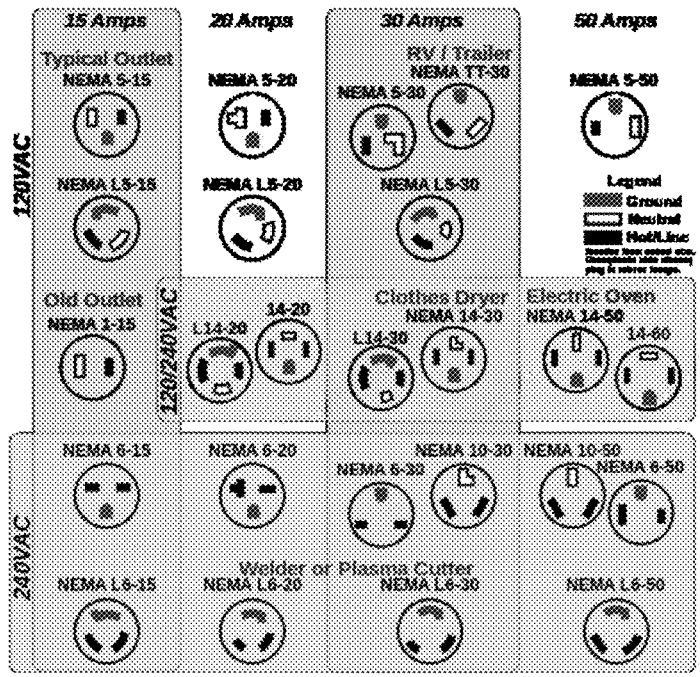
FIG. 1B shows one universal connector structure accommodating multiple power types which can be used with various embodiments.
Figure 1B:
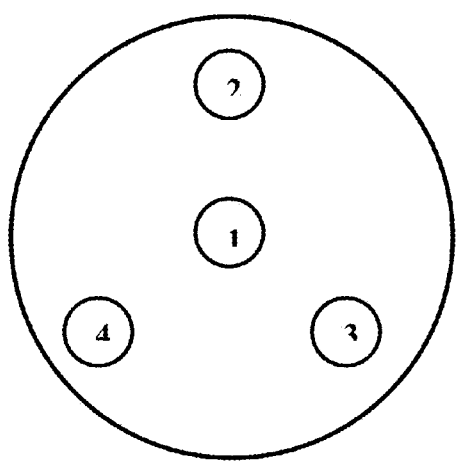

FIG. 1B shows one universal connector structure accommodating multiple power types which can be used as connector 55. The universal connector includes, as shown, four (4) terminals, labeled as 1, 2, 3 and 4 in the figure. They may be simple pin-type connector terminals. The use of the various combinations of the terminals for different power types can provide a simple means for distinguishing power types at the connector. The table in the figure shows some exemplary uses for terminals 1-4 of the connector. Terminal 1 may be used as a ground or neutral terminal for all power types; but since the ground and neutral could be alternatively be connected to a grounded housing or other location which is equivalent, it need not be used in all cases and thus is indicated as optional in the table as (1). Terminals 2, 3, and 4 may be used for DC and various AC types, based on their combination as indicated in the table.

Returning to FIG. 1, the controller 60 of the converter 100 determines the inputs and/or output terminals 50 required, the number and the configuration of ECMs 30 needed, generates and provides control signals to the needed ECMs 30, and configures and controls the switch matrix 40 as needed for desired power. Moreover, the controller 60 can individually control the ECMs 30 and the switches S of the matrix 40 to electrically connect one or more ECMs 30 with one or more terminals 50 as may be required for desired power requirements of the converter 100.

The ECMs 30 are selected and controlled by the controller 60 to provide the required current for load requirements at the terminals 50. Associated with the controller 60 there may be a lookup table or database (stored in memory), for instance, which provides the controller 60 with the knowledge of the number and the current rating for each of the ECMs in a particular converter implementation. Or the ECMs can provide feedback to the controller providing size, voltage health, current ratings, and other parameters, for instance. This may be advantageous especially if using plug-in modules for the ECMs. In general, the sum of current ratings of selected ECMs needs to be greater than or equal to the current required by the load at an output. A simple additive iterative scheme can be executed by the controller 60 to determine which ECMs will be needed to satisfy the current load, for example. If the current requirement of load is greater than what the converter 100 can possibly supply, the controller 60 may provide an error message and prevent operation and thus overloading and/or damage.

Consider, as an example, a current load requirement of 20 A for the aforementioned 100 A rated converter 100 including ten (10) 5 A-rated ECMs, fifteen (15) 2 A-rated ECMs, and twenty (20) 1 A-rated ECMs, the controller 60 could selected the two (2) 5 A-rated ECMs and five (5) 2 A-rated ECMs providing a total of 20 A. In a second example, a current load of 7 A is desired; the controller 60 could select (i) two (2) 5 A-rated ECMs providing 10 A total, (ii) one (1) 5 A-rated ECM and two (2)2 A-rated ECMs for 7 A total, or (iii) one (1) 5 A-rated ECM and two (2) 2 A-rated ECMs providing 9 A total.

The controller 60 is further configured to send control signal to one or more selected ECMs 30 directing those ECMs 30 to provide power conversion of desired voltage, frequency, and/or phase. For example, the controller 60 can generate a pulse width modulated (PWM) control signals to this end. The PWM signals can provide adjustable control of the individual ECMs 30 to provide variable voltage and frequency output, matching for both multiphase and ganged applications for high current operation. The number of PWM signals and the time shift of each PWM signal may be based on the number of phases of power required. For 3-phase AC power, for instance, the phases of the PWM signals may each be shifted by 120°. DC power for the most part does not require frequency or phase control.

The controller 60 generates and sends control signals to one or more switches S of the switch network 40 turning them 'ON' to complete a circuit, or 'OFF' to break the circuit between selected ECMs 30 and terminals 50. For explanation purposes, the ECMs 30 have been color-coded (shaded) by current ratings and the individual switches of the switch matrix 40 are similarly color-coded to better show which ECMs they connect to. The controller 60 may further be configured to continuously monitor the inputs and outputs of the ECMs 30 to ensure the desired voltage, frequency, phase and current requirements are met. Also, by operating the multiple ECMs 30 slightly out of phase (e.g., ±5°, for AC output) or time (for DC output), ripples can be reduced when current is summed. Filtering may also be used to reduce ripple, especially for DC power operation.

In a multi-phase AC configuration, the phase of the inputs/outputs could also be monitored to ensure that the angle(s) between phases are properly maintained. Additionally, in some embodiments, current, voltage, temperature and other sensors may be incorporated in the power converter which might provide low level diagnostics of the overall converter 100 system.

For AC power, voltage, frequency, and phase requirements can all be executed using pulse-width (PWM) modulation of one or more ECMs 30 as further discussed below with respect to FIGS. 4A and 4B. Some common AC power includes 120V (60 Hz), 240V (60 Hz); 208 and 480 (60 Hz 3 Phase); 110V, 220V (50 Hz); 115 (400 Hz), for instance. In a multi-phase AC system, the phase output would also need to be monitored to ensure the angle between phases are properly maintained. It is also possible to provide outputs to multiple terminals from a single selected ECM. In this mode of operation, the selected ECM's current limit would have to be equal to or higher than the sum of all current required to be provided, and all outputs would have to be the same voltage, frequency, and phase. To connect the single ECM to multiple terminals 50 requires the matrix switches corresponding to the ECM and terminals to be judiciously controlled by the controller as well.

In some implementations, the controller 60 can further monitor output to ensure the requested and actual output are consistent. The user can provide the system information on the numbers and types of connections and requirements for voltage, frequency, phase and/or current. The control system then generated the PWM signal(s) with the proper parameters to meet desired phase, voltage and frequency levels. For DC power, only voltage and current requirements are of general concern though.

Figure 2:
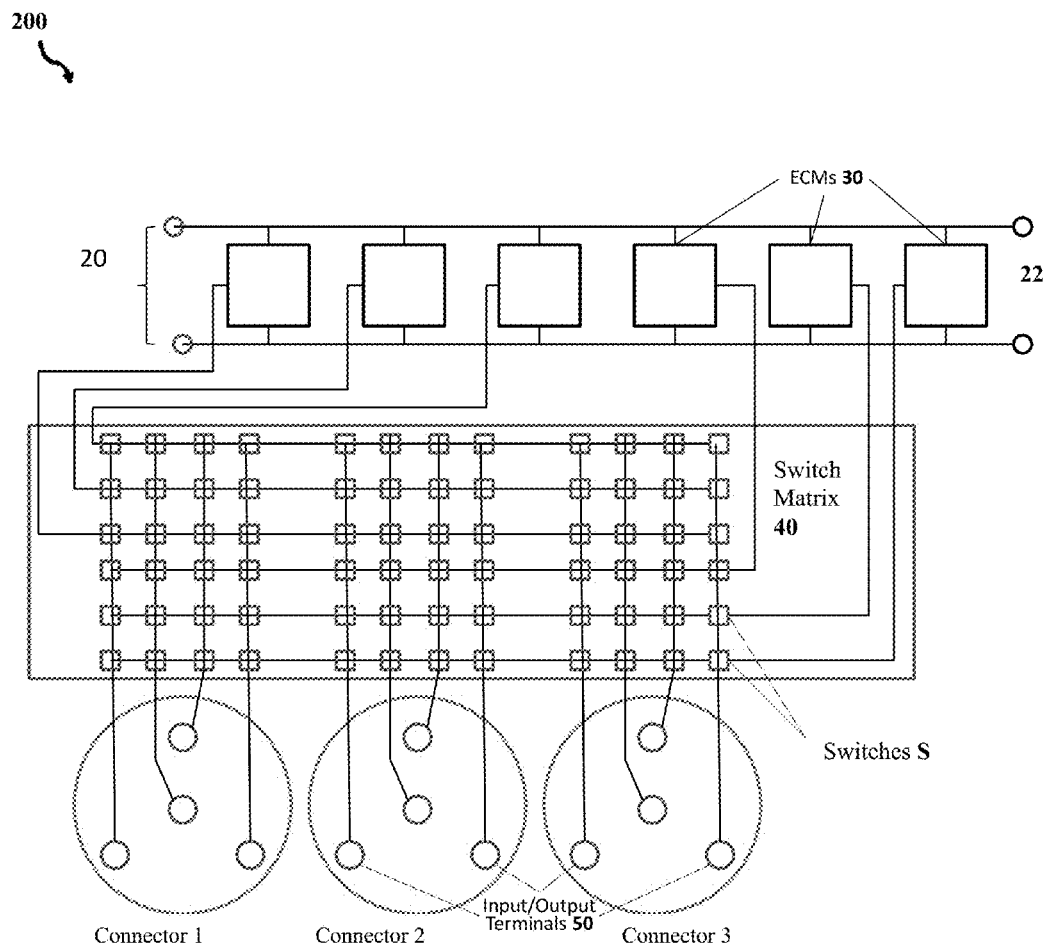
FIG. 2 shows an exemplary converter embodying the scalable universal power supply and/or power converter architecture illustrated in FIG. 1.

FIG. 2 show one exemplary converter 200 embodying the scalable universal power supply and/or power converter 100 architecture illustrated in FIG. 1. It consists of six (6) ECMs 30 connected to a two rail bus 20. The terminals 50 here each have four terminals and are grouped in three connectors 55. The matrix 40 includes seventy two (72) switches arranged in an array of rows and columns. The number of columns, six here, corresponds to the number of ECMs. The rows of the switch matrix are arranged in three groups of, here, which correspond to the number of connectors in the input/outputs terminals 50.

Figure 3:
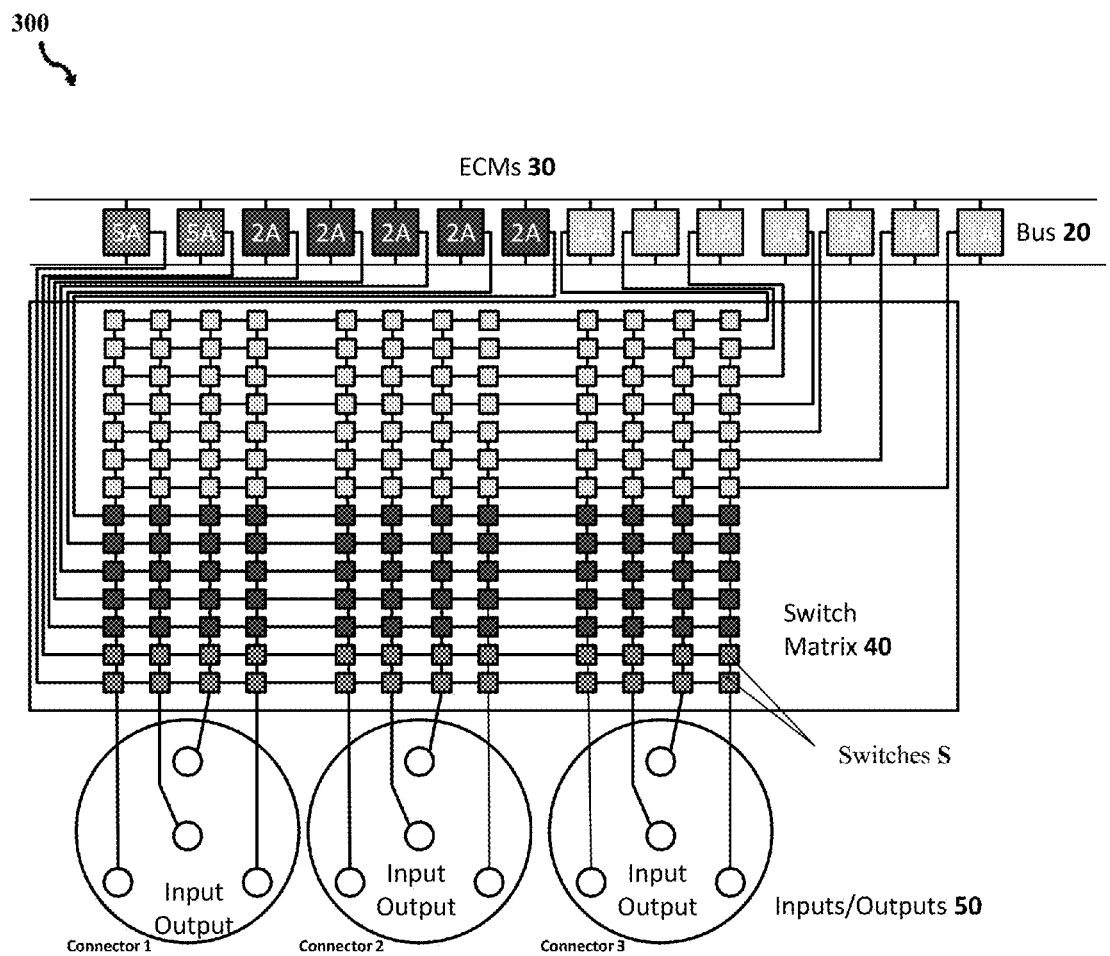
FIG. 3 shows another exemplary converter embodying the scalable universal power supply and/or power converter architecture illustrated in FIG. 1.

FIG. 3 show another exemplary converter 300 embodying the scalable universal power supply and/or power converter 100 architecture illustrated in FIG. 1. It consists of fourteen (14) ECMs 30 connected to a two rail bus 20. The ECMs 30 here have current ratings range from 1 A to 5 A and as shown here include two (2) 5 A-rated ECMs, five (5) 2 A-rated ECMs, and seven (7) 1 A-rated ECMs. They can be grouped and arranged in decreasing order with respect to the current handling, but this arrangement is more of convenience not a necessity. This provides the converter 300 with variable current ratings, ranging from 1 A up to 27 A for power conversion, depending on which ECMs are may be selected for a particular power conversion.

The input/outputs terminals 50 include three discrete connectors 55 each having four terminals, shown, but the number of terminals can be higher or lower in other embodiments. Connectors may connect to a load and with four terminals can provide 3-phase AC power. The matrix 40 includes one hundred sixty eight (168) switches arranged in an array of row and columns. The number of columns, fourteen (14) here, correspond to the number of ECMs. The rows of the switch matrix are arranged in three groups of four, which correspond to the number of terminals in the input/outputs 50, which is twelve (12) here.

Figure 4A:
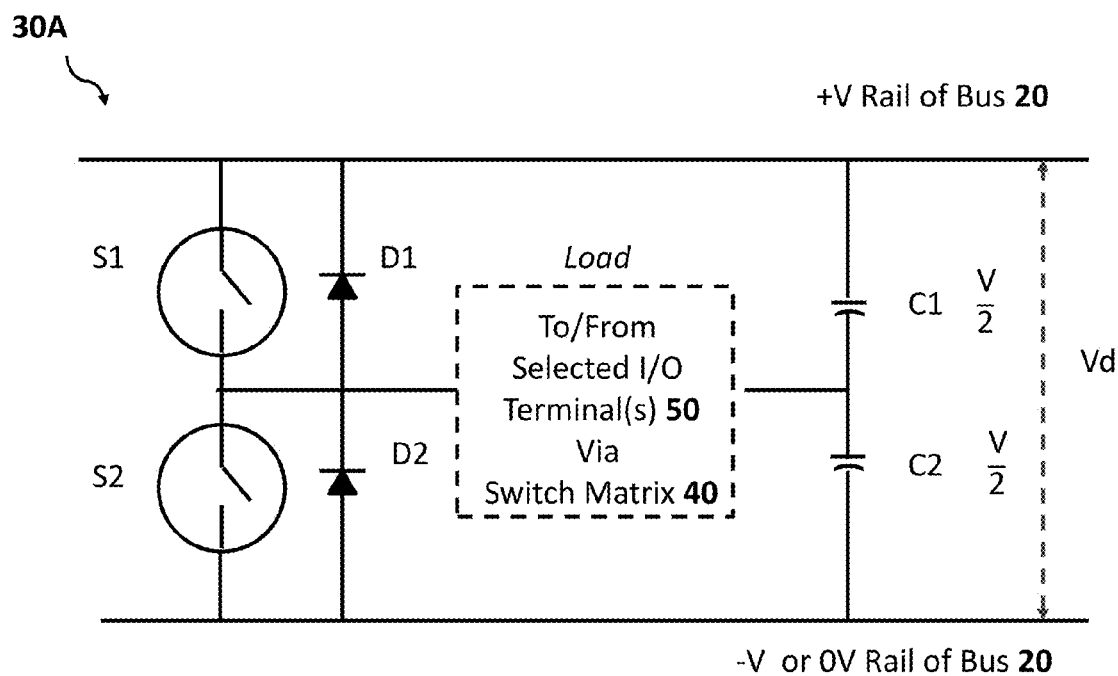
FIGS. 4A and 4B shows two exemplary electronic conversion modules which may be used in accordance with various embodiments.
Figure 4B:
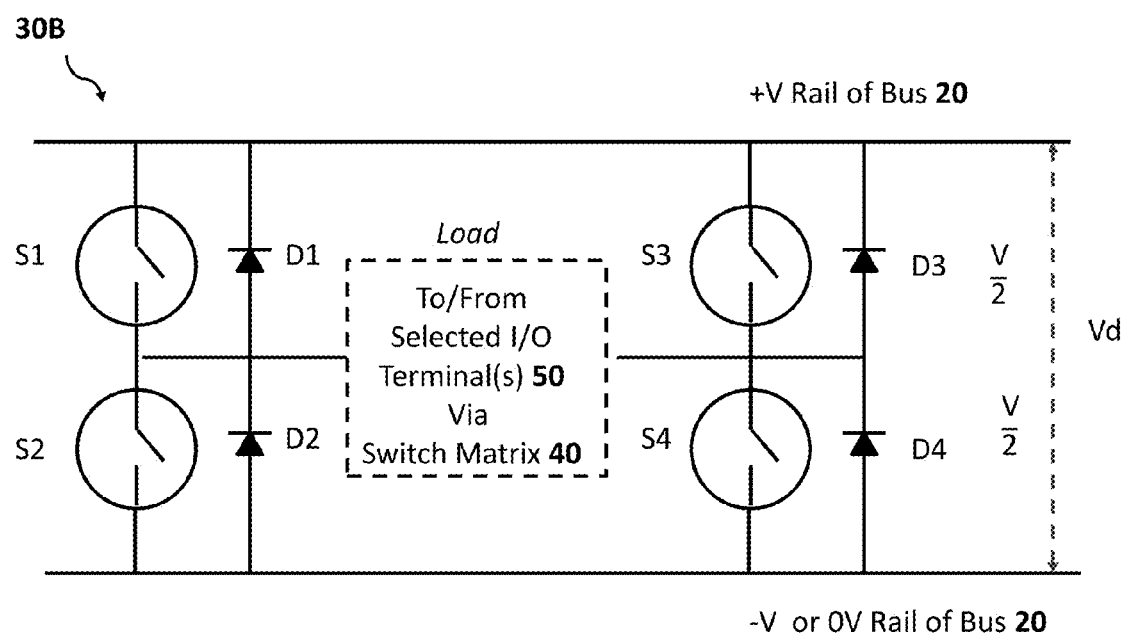

FIGS. 4A and 4B show two exemplary electronic conversion modules which may be used in accordance with various embodiments. One or more ECMs 30 are used to modify the input and output power parameters including voltage, frequency, phase and current. For most power conversion operations, the ECMs 30 may based upon a modified H-bridge circuit used for power conversion. An H-bridge is a circuit that enables a voltage to be applied across a load in either direction. Either a Half H-bridge or Full H-bridge circuit may be used for the ECMs as shown in FIGS. 4A and 4B, respectively. Although, as known in the electronics art, there may be trade-offs in terms of performance, costs, operation, etc., in selecting a circuit design whether it is a Half-H bridge or Full-H bridge.

FIG. 4A shows an electrical conversion module 30A which is configured as a Half H-bridge circuit according to an embodiment. In general, the ECM 30A includes an upper switch S1 and a lower switch S2 along with freewheeling diodes D1 and D2 in an anti-serial arrangement. The upper switch S1 and the lower switch S2 are automatically controlled by, and receive control signals from the controller 60, for individually turning 'ON' or 'OFF' a given switch. The freewheeling diodes D1 and D2, while not needed for all embodiments, advantageously prevent voltage spikes due to reverse current when the power is turned 'OFF' to the switches. One diode is placed in parallel with each of the switches. The parallel diodes provide a path for any energy still stored in the load or lines to be dissipated once the switch is closed. Capacitors C1 and C2 may be provided in series with the load to provide filtering of any high order harmonics.

The upper switch S1 is located between the high voltage supply and the load to be driven. The lower switch S2 is located between load and the low voltage supply rail. Switches S1 and S2 may be solid-state devices, such as MOSFETs, IGBTs, etc. which can operate to achieve accurate reproduction of output signals (e.g., at frequencies above about 10 kHz). Alternatively, any switch that is fast, reliable and meets voltage and current requirements can be used.

The ECM 30A outputs energy to the load (i.e., at selected terminals 50) through the action of turning the switches 'ON' and 'OFF'. To create a high voltage at a selected load, the upper switch S1 is turned 'ON' allowing current to flow to the load through it while the lower switch S1 is used to provide the low voltage part of the output signal. Switches S1 and S2, however, should not both be in the 'ON' state at the same time as this situation will cause a direct short between the high voltage and low voltage supply rail.

The maximum power output of the Half H-bridge circuit is based on the current and voltage specification of the switches. For safe operation, each ECM 30A should safely operate at the supply rail maximum voltage and would have a specified maximum current limit. By controlling the periods that each of the switches S1 and S2 are in the 'ON' or 'OFF' state, power can be converted. For many types of power conversion, a Pulse Width Modulation control technique may be implemented to control the ECM 30A, as further explained below.

FIG. 4B shows an electrical conversion module 30B which is configured as a Full H-bridge circuit according to an embodiment. In general, the electrical conversion module 30B includes two upper switches S1, S3 and two lower switches S2, S4 along with freewheeling diodes D1, D2, D3 and D4. The upper switch S1 and the lower switch S2 are automatically controlled by, and receive control signals from the controller 60, for individually turning 'ON' or 'OFF' a given switch. The freewheeling diodes D1-D4 prevent voltage spikes due to reverse current when the power is turned off to the switches. One diode is placed in parallel with each of the switches. The parallel diodes provide a path for any energy still stored in the load or lines to be dissipated once the switch is closed.

In operation, opposite-aligned pairs of switches are typically operated in unison. That is, switches S1 and S3 are both turned 'ON' or 'OFF' together, and switches S2 and S4 are both turned 'ON' or 'OFF' together. Switches S1 and S2 however, should not both be in the 'ON' state at the same time as this situation will cause a direct short between the high voltage and low voltage supply rail. The same goes for switches S3 and S4. By controlling the periods that each of the switches S1 and S2, and S3 and S4, are in the 'ON' or 'OFF' state, power can be converted.

Pulse Width Modulation (PWM) can be used to control selected H-bridge ECMs 30 in a number of ways. It may be used for DC-to-AC conversion, DC-to-DC conversion, AC-to-DC conversion, and AC-to-AC conversion.

DC-to-AC Power Conversion Via PWM

FIGS. 5A-5D show exemplary DC-to-AC PWM control schemes which could be implemented by one or more electrical conversion modules 30 in accordance with embodiments for DC-to-AC power conversion.

The PWM scheme is executed by the controller 60. In this technique, the power bus 20 is connected to one or more selected ECMs 30 for power conversion to terminals 50 or connector 55 or via the switch matrix 40. One or more selected ECMs 30 are configured and operated as an inverter circuit to converted DC power to AC power. The power bus 20 here may be configured to operate as a DC power bus supplying the input DC power; for example, it may consist of both a positive and negative or 0 voltage power rail which are connected to the selected ECMs 30 which output AC power.

The controller 60 provides control signals to the switches of selected ECMs 30 for individually switching them either in the 'ON' or 'OFF' state. While the technique discussed here is generally for a half H-bridge ECM 30A shown in FIG. 4A, it will be appreciated by one skilled in the art that the technique can similarly be performed by the full-bridge circuit ECM 30B shown in FIG. 4B with minimal modification.

Pulse width modulation techniques for generating square wave control signals for producing sinusoidal waves is known. See, e.g., Ned Mohan, Tore M. Undeland, and William P. Robbins, "Power Electronics: Converters, Applications, and Design," John Wiley & Sons, Inc., 2003, Chapter 8, herein incorporated by reference. The controller 60 may implement this technique to make the ECM 30A converting DC power to AC power. In general, when either the high or low switches S1 or S2 of the ECM 30A is switched 'ON' the rail input voltage of that switch appears at the output. The controller 60 controls the duty cycle of the switches, such that by selectively turning 'ON' and 'OFF' the switches, the DC input voltage from the bus 20 become an AC output voltage having a sinusoidal waveform. The voltage level at the output is a function of the PWM square wave duty cycle determined by the amount of 'ON' time over a given period, and the low and high input voltages.

By varying the duty cycle, voltages on the output can be varied from 0 V at 0% duty cycle all the way up to full rail voltage at a 100% duty cycle. To achieve a sinusoidal output voltage characteristic required for a desired frequency of the AC output signal from a DC input voltage requires varying duty cycles over half or full sine wave period. At the initiation of the output sine wave, the PWM square wave signal applied to the switches S1 and S2 has a very low duty cycle. Each square wave that follows has an increasing duty cycle until the sine wave peak, at which time the duty cycle also peaks. The duty cycles are then shortened as the sine wave amplitude reduces back to the zero crossing point. To achieve a clean, high resolution output signal requires that the PWM signal be at a much higher frequency (e.g., usually >10 kHz) than the peak sine wave frequency required. This allows a very accurate reproduction of the sine wave.

Figure 5A:
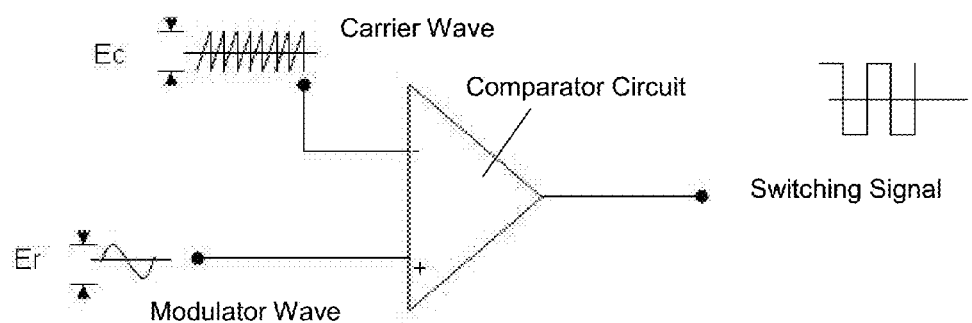
FIGS. 5A-5D show exemplary DC-to-AC PWM power conversion control schemes which could be implemented by one or more electrical conversion modules in accordance with embodiments.
Figure 5B:
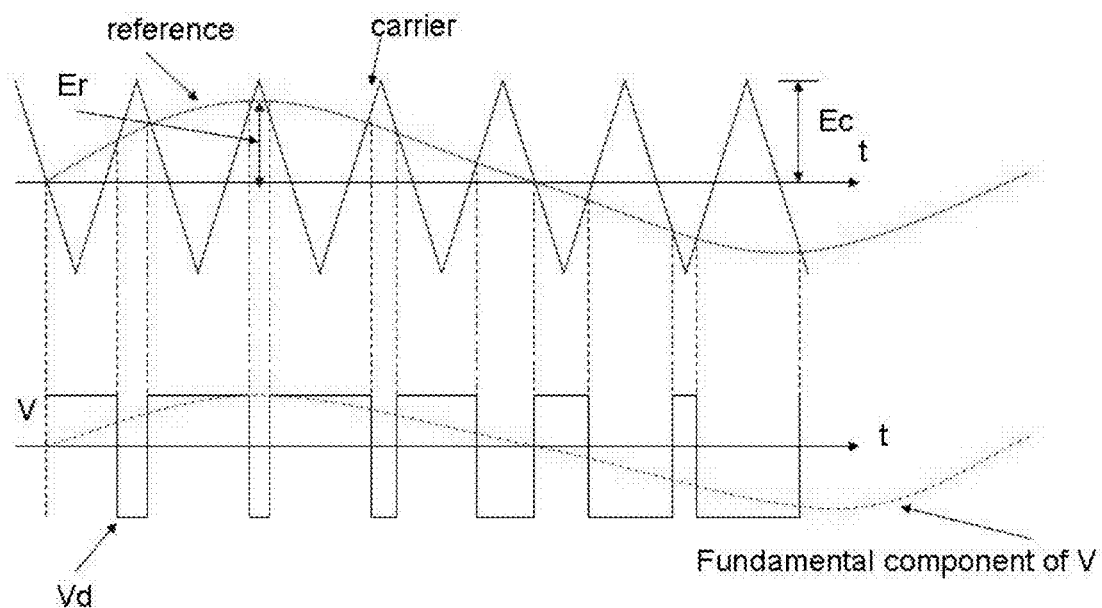

Many different PWM control schemes exist for DC-to-AC power conversion. One of the simplest ways to generate a PWM signal is the bipolar PWM technique as shown in FIGS. 5A and 5B. This technique uses a high-frequency modulation or carrier wave signal Ec, such as a sawtooth or triangular wave, and a low-frequency sinusoidal reference wave Er. Both the carrier wave Ec and the reference wave Er can be generated by respective oscillator circuits. A comparator circuit is used to compare the carrier wave Ec and the reference wave Er and to generate an a square-wave switching signal. As shown in the plot in FIG. 5B, when the value of the reference wave Er is more than the carrier wave Ec, the comparator sets the PWM signal to the high state, otherwise it is in the low state.

The amplitude and frequency of the carrier wave Ec are generally fixed. On the other hand, both the amplitude and frequency of the reference wave Er are variable which are used for controlling the amplitude and frequency of the output AC signal. The frequency of the reference wave determines the frequency of the generated AC voltage.

The amplitude of the output AC voltage can be regulated by the variation of the reference wave Er amplitude. In particular, the amplitude of the reference signal can vary from 0 to the maximum amplitude of the carrier wave Ec, such that the modulation index m or ratio of the carrier wave to the carrier wave Ec ranges from 0 to 1. The amplitude of the AC voltage has a dominant fundamental components and very high order harmonics. For an input DC voltage $V_d$, the RMS value of the of fundamental of the AC voltage output may be characterized as $mV_d/2\sqrt{2}$. For many loads, such as motors, harmonics are not very influential on operation. However, harmonics can be controlled by varying the carrier ratio which is the frequency of the carrier wave Ec to the frequency of the reference wave Er. Setting this value to be odd and as large as possible (e.g., around 100), for example, may be ideal for many applications.

Of course, it will be appreciated that other PWM techniques exist and may also be used. For instance, space vector modulation is another known PWM technique that may be implemented by the controller 60; it self-generates a square-wave switching signal without using a comparator circuit.

Figure 5C:
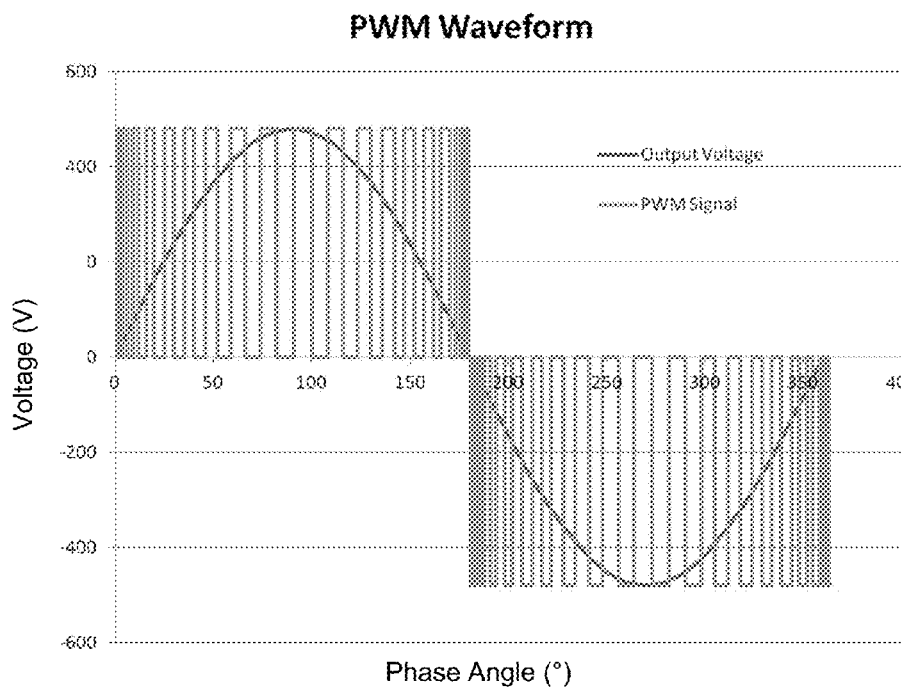

The plot of FIG. 5C show one exemplary PWM square-wave switching signal and output AC signal as a function of phase (or time). Multiple phases could be generated by utilizing individual ECM sets for each phase with multiple time-shifted PWM signals provided by the controller 60 to each set of ECMs. The number of PWM signals and the time shift of each would be based on the number of phases required for a particular power conversion. For 3-phase output requiring 3 PWM signals, the 0 points of each of the PWM signals would be shifted ⅓ of the full sign wave period (i.e., 120°) for the preceding phase. A split phase system consisting of 2 phases would require 2 PWM signals with each shifted ½ the full sine wave period (i.e., 180°) from the previous.

Figure 5D:
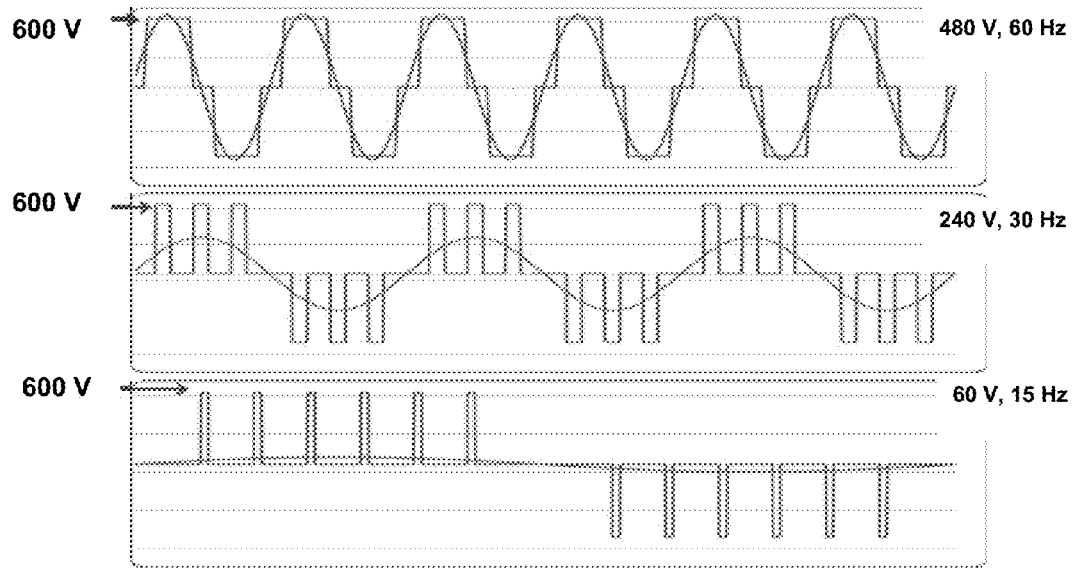

FIG. 5D shows examples of different AC wave forms generated by a DC-to-AC PWM technique. The maximum peak voltage of the square-wave switching signal used to generate these three wave forms is the same, i.e., 600V. However, by adjusting the rate that the duty cycle changes during the sine wave period, via PWM, wave forms having different output voltages and frequencies can be generated, e.g., 480 V at 60 Hz, 240 V at 30 Hz, and 60 V at 15 Hz. For achieving a clean output sine wave, the peak output voltage should be limited to approximately 80% of the RMS input voltage. By modulating the duty cycle of the PWM signal, in this manner, essentially any voltage up to the peak voltage at any frequency can be generated.

DC-to-DC Power Conversion Via PWM

PWM can be used for DC-to-DC power conversion also. Only conversion of voltage level is of consequence for this operation as frequency and phase are not a factor for DC power. The DC-to-DC PWM scheme is executed by the controller 60. In this technique, the power bus 20 is connected to one or more selected ECMs 30 for power conversion to terminals 50 or connector 55 or via the switch matrix 40. The power bus 20 here will be configured to operate as a DC power bus supplying the input DC power; for example, it may consist of both a positive and negative or 0 voltage power rail which are connected to the selected ECMs 30 which output DC power.

For DC-DC power conversion, the input voltage differs from that of the output voltage. For example, the input DC voltage may be higher than the output DC voltage. In this situation, one or more ECMs 30 will be used to step-down or reduce the voltage from the DC bus voltage to the lower level at the load. One way to do this is have one or more ECMs configured and operated as a buck converter circuit. A buck converter is a well-known voltage step down and current step up converter circuit. The ECMs illustrated in FIGS. 4A and 4B require essentially require no structural changes here for this operation.

The controller 60 provides control signals to the switches of selected ECMs 30 for individually switching them either in the 'ON' or 'OFF' state. While the technique discussed here is generally for a half-bridge ECM 30A shown in FIG. 4A, it will be appreciated by one skilled in the art that the technique can similarly be performed by the full-bridge circuit ECM 30B shown in FIG. 4B with minimal modification.

Figure 6A:
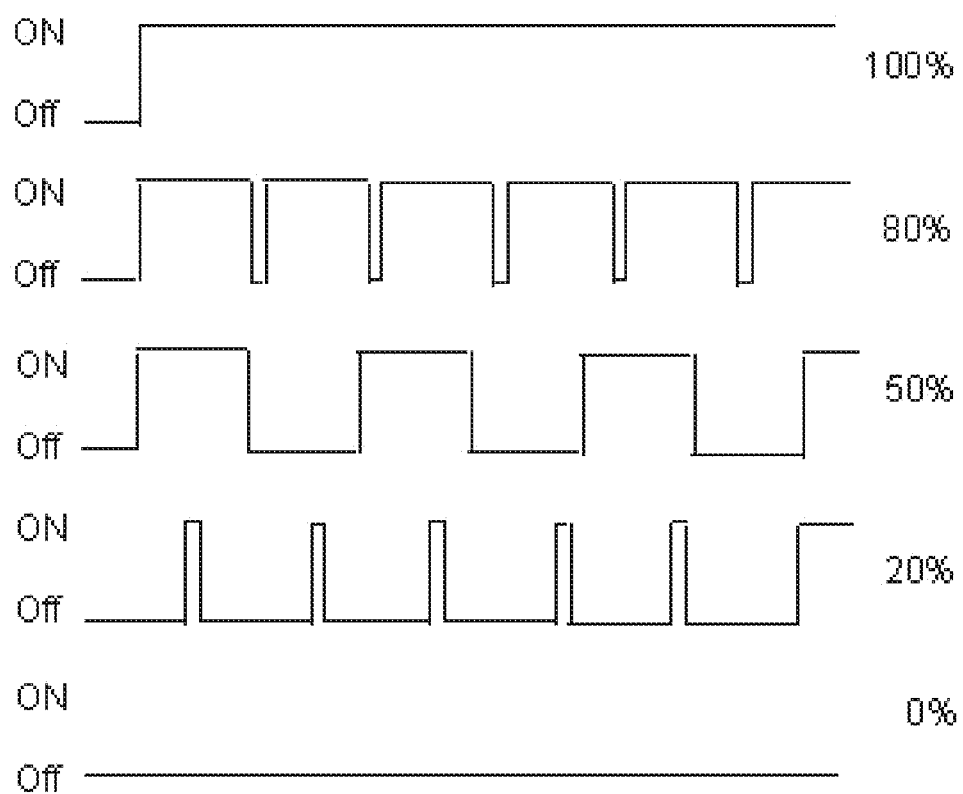
FIGS. 6A-6C show exemplary DC-to-DC PWM power conversion control schemes which could be implemented by one or more electrical conversion modules in accordance with embodiments.

DC-DC power conversion can be executed by controlling the duty cycle of one or more ECMs 30. The duty cycle D is fixed throughout the conversion is defined as follows:

$$D = \frac{T}{P} \times 100\%$$

where, T is the time the signal is active, and P is the total period of the signal. Thus, a 60% duty cycle means the signal is switched 'ON' 60% of the time and switched 'OFF' 40% of the time. The desired output DC voltage can be achieved by judiciously controlling the switching of selected ECMs 30 by varying their duty cycle. In general, for stepped-down DC-to-DC voltage conversion, $V_{output}$=Duty Cycle*$V_{input}$. FIG. 6A shows square-wave PWM control signals of varying duty cycles for 0%, 20%, 50%, 80% and 100%.

In this mode of operation, the input to ECM 30A upper switch S1 is controlled using a continuous duty cycle D signal. The load's input is connected to the midpoint on the ECM 30A and the lower switch S2 is left in the 'OFF' position. The load's negative connection is either connected to the ground or preferably it is connected to another ECM. If configured in this mode, the lower switch S2 of the second ECM is kept closed tying the connection to the negative bus rail and its upper switch S1 is left in the 'OFF' position.

Alternatively, the output DC voltage may be greater than the input DC voltage. In this situation, one or more ECMs 30 will be used to step-up or increase the voltage from the DC bus voltage to the lower level at the load. One way to do this is to have one or more ECMs configured and operated as a boost converter circuit. A boost converter is a well-known voltage step up and current step down converter. Also, boost-buck H-bridge circuits also exist which can provide both functions although operation is a bit more complex. See, e.g., K. Okura, et al. "High Efficiency Operation for H-Bridge DC-DC Converter," 8th International Conference on Power Electronics, Jeju Korea, May 30-Jun. 3, 2011, herein incorporated by reference. The ECMs illustrated in FIGS. 4A and 4B would require some structural changes here for this type of operation which is within the skill of the art. A power storage element is necessary to temporarily store energy for stepping up to a higher voltage. An inductor is typically used for this purpose. Stepping voltage down is much simpler to execute and would be expected to be more universally used for most power applications. For instance, going from 600V down to 28V or 12V is much less challenging than boosting 28V up to 600V. While not shown herein, it is envisioned that an ECM could be configured and operation according the aforementioned Okura article according to embodiments.

Figure 6B:
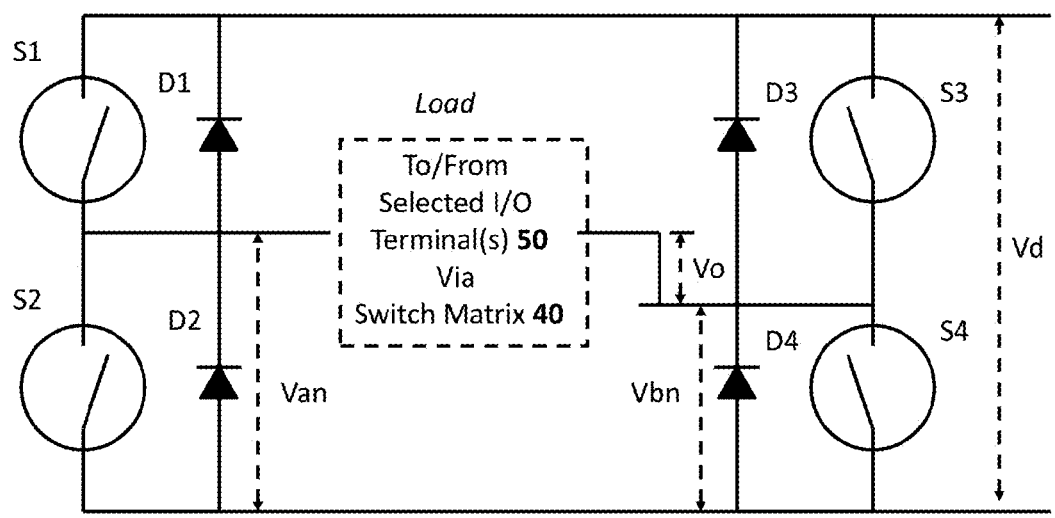

FIG. 6B shows an embodiment for DC-DC conversion using a full H-Bridge ECM 30B shown in FIG. 4B. Power may be input from the bus 20 and output to desired terminals 50 or connectors 55, or vice versa. The controller 60 selects one ECM 30B which is electrically connected to desired terminals 50 or connectors 55 via the switch matrix 40 providing inputs and/or outputs. The controller 60 separately controls the duty cycle D of the switches on left and right sides within the selected ECM 30B. Thus, Van=$D_{Switch\ 1}$*Vd and Vbn=$D_{Switch\ 3}$*Vd. The difference in their voltages, Vo=Van−Vbn, is applied to the load.

Figure 6C:
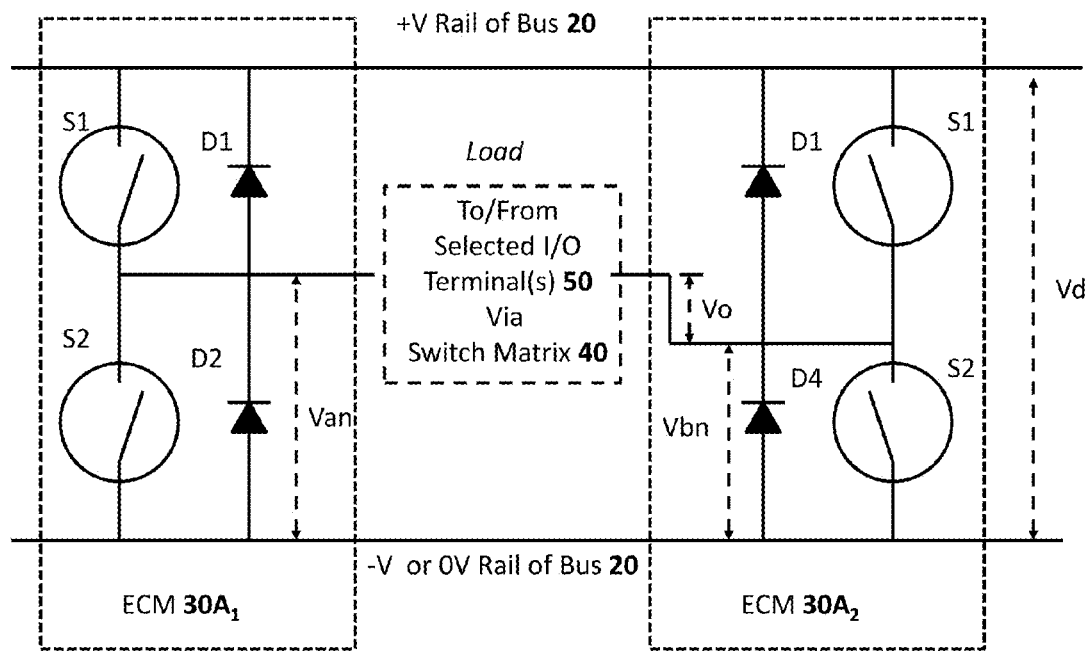

FIG. 6C shows an another embodiment for DC-DC conversion using two half H-Bridge ECMs 30A shown in FIG. 4B. This embodiment might be used where no voltage is initially present on bus 20. The controller 60 selects two ECMs 30A: ECM 30A$_1$ for inputting a DC voltage and ECM 30A$_2$ for outputting a DC voltage in the figure. ECM 30A$_1$ and ECM 30A$_2$ are electrically connected to respectively terminals 50 or connectors 55, respectively, via the switch matrix 40 providing inputs and outputs. The controller 60 separately controls the duty cycles D for each of ECM 30A$_1$ and ECM 30A$_2$. The duty cycles of the upper/lower switches are fixed for DC-to-DC conversion. Accordingly, the voltage for ECM 30A$_1$ is Van=$D_{Upper\ Switch\ 1\_ECM30A1}$*Vd, and the voltage for ECM 30A$_2$ is Vbn=$D_{Upper\ Switch\ 1\_ECM30A2}$*Vd. The difference in their voltages, Vo=Van−Vbn, is applied to the load.

AC-to-DC Power Conversion Via PWM

PWM can be used for AC-to-DC power conversion also. Only conversion of voltage level is of consequence for this operation as frequency and phase are not a factor for DC power output; although, the AC input requires frequency and phase control.

The AC-to-DC PWM scheme is executed by the controller 60. In this technique, input AC power is from a load connected to terminals 50 or connector 55, and DC power output to the power bus 20. One or more selected ECMs 30 are configured and operated as a rectifier circuit to converted AC power to DC power. The load (at terminals 50 or connector 55) is connected to the selected ECM(s) 30 via the switch matrix 40.

For AC-DC power conversion, conversion is fairly limited. Generally, the maximum DC output voltage is limited by the input AC voltage. This technique may be used to covert multi-phase AC power to DC. One simple way to covert AC-to-DC, is for the controller 60 to open up all the switches, i.e., turn them 'OFF,' in the ECMs 30A, 30B. This would effectively turn those circuits into half- and full-bridge diode bridge rectifiers, respectively. Unfortunately, this operation may be disadvantageous for some application due to generation of harmonics.

Thus, a more preferred methodology would be for controller 60 to implement a PWM rectifier signal control process utilizing the full H-bridge configuration of ECM 30B (FIG. 4B) providing both positive (hot') and neutral connections across an input load. For AC-to-DC operation, the full H-bridge ECM 30B could be run in an active rectification mode rather than in an switch mode inverter used for AC-to-DC conversion. In this case, the ECM switches are run "backwards" and the AC is converted to DC. This PWM technique is used in many motor drive systems (including locomotives, cranes and other applications) to provide current to the motor when the vehicle is accelerating, but then reverses that current usually feeding a resistor grid which slows the vehicle by converting the forward movement into heat through the resistors. This is called dynamic braking and can provide as much horsepower in braking mode as the engine produces without heating the wheel braking systems. See, e.g., J. R. Rodriguez et al., "PWM Regenerative Rectifier: State of the Art," IEEE Transactions on Industrial Electronics, Vol. 52, No. 1 (2005), herein incorporated by reference. This operation can be summarized as follows: switches S1 and S2 are turned 'ON' and S2 and S3 are turned 'OFF' when the input AC voltage is positive; switches S1 and S4 are turned 'OFF' and S2 and S3 are turned 'ON' when the input AC voltage in negative; and switches S1 and S3 are turned 'ON' and S2 and S4 are turned 'OFF' (or alternatively, S1 and S3 are turned 'OFF' and S2 and S4 are turned 'ON') when the input AC voltage is near 0, e.g., ±5 volts. Of course, it will be appreciated by one skilled in the art that other control techniques might also be used.

AC-to-AC Power Conversion

For most applications, it is envisioned that the power bus 20 will be configured to supply DC power. To input AC power to the bus (for instance, from a terminal or connector), it will need to be first converted to DC power, for instance, using an AC-to-DC PWM power conversion technique. AC power can be output to a terminal or connector using an DC-to-AC PWM power conversion technique. This case would be analogous to having the input run first through the AC-to-DC conversion as previously described to the power bus 20 and then put through DC-to-AC conversion.

Figure 7:
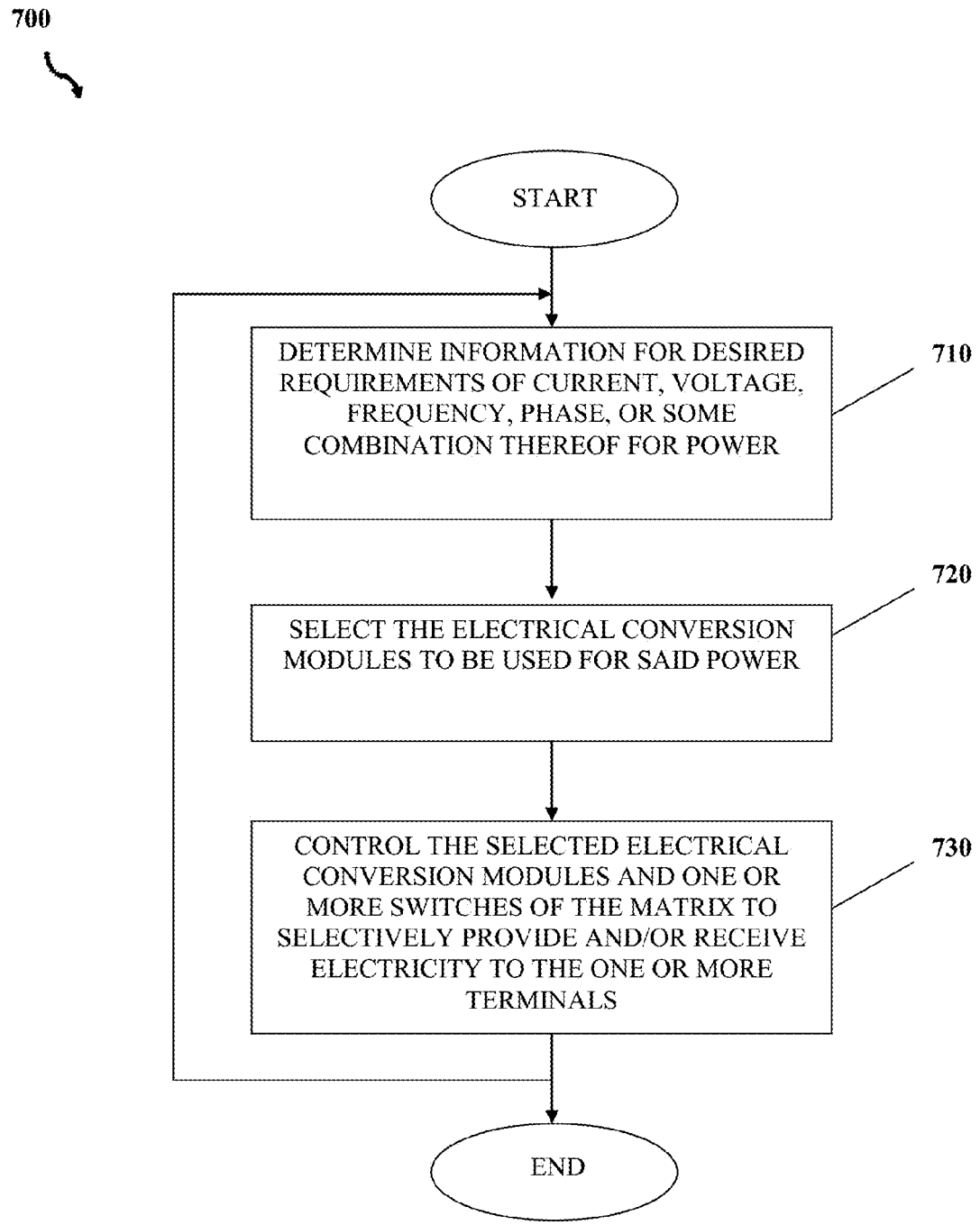
FIG. 7 shows an exemplary methodology for controlling a scalable universal power supply and/or power converter according to an embodiment.

FIG. 7 shows an exemplary methodology 700 for controlling the scalable universal power supply and/or power converter 100 according to an embodiment. This control methodology is implemented by the controller 60 of the converter 100. The controller 60 may be implemented as hardware, software or a combination thereof specifically configured to execute coding or instructions necessary to implement embodiments of the present invention. Processor-executable code can be stored in a memory device and execute by the processor or controller as needed. In some implementations, software code (instructions), firmware, or the like, may be stored on a computer or machine-readable storage media. The controller 60 may be implemented with one or more processors or programmable processors, such as, for example, a field-programmable gate array (FGPA) or an application-specific integrated circuit (ASIC) processor. The methodology disclosed herein may be implemented and executed by an application created using any number of programming routines. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Following the start of the method, in step 710, the controller 60 determines information for requirements of voltage, frequency, phase, current, or some combination thereof for desired power. In determining information for requirements of for power, the controller determines the requirements based on: the load itself; user-input; and/or pre-determined input and/or output power.

The load at the input or output may determine these requirements. Assuming the converter 100 is provided with standardize or universal connectors (see, e.g., FIGS. 1A and 1B), the requirements can be determined, or at least inferred, from the connector types themselves. The controller 60 may included a look-up table of power requirements for each of its connectors or terminals. Sensors or switches could be located at or near the connectors 55 which indicate whether a particular connector 55 (or terminal configuration) is being used, at any time. For instance, a simple contact switch, included in one or more terminals 50 and/or a connector 55, may be engaged when a user plugs into that terminal or connector. An adapter to provide specific input/output requirement, such as NEMA requirements, could be engaged, for example, by rotating the connector (in a twist-and-lock type engagement) or by pressing the connector in (in male-female type engagement) in which lines up electrical contacts. When tripped, the controller 60 would know that connector 55 is in use, and then by consulting the look-up table know the requirements and terminals associated with that connectors 55. Thus, if a NEMA 5-15 connector is engaged (FIG. 1A, top left), the controller 60 would know that it is for 120 V single-phase AC power, at 60 Hz and current up to 15 A, and which terminals 50 in the connector 55 to utilize.

Dynamic sensing means might also be employed. For instance, an electrical sensing signal may be generated which enables the controller 60 to automatically determine the power requirements of a load or source; such technology currently exists, albeit, to limited success, but is expected to become more effective and readily used in the future.

User-input may be achieved by means of one or more of: screens, dials, buttons, switches, knobs, or the like, which enable the user to select desired parameters for an input or output. For instance, the user may select or input voltage, frequency, phase, and/or current requirements for an input or output by these means. Presets could also be provided for standardize power types.

Certain connectors 55 may be permanently connected (i.e., hardwired) and have designated input and/or output power requirement known by the controller 60. These might correspond to critical or important systems which are (nearly) always needed in operation.

Next in step 720, the controller selects which electrical conversion modules 30 to be used for said power. The controller 60 determines which and how many of the ECMs 30 and which switches of switch matrix 40 would be used for providing the desired power requirements. In selecting which electrical conversion modules to be used for said power, the controller may utilize a rule-based routine. Within the controller memory may be a look-up table which depicts the current ratings of the various ECMs, for example. The controller may sort the look-up table of ECMs by current rating from highest to lowest to determine which ECMs to select for use. The sum of the current ratings of selected ECMs 30 should meet or exceed that of the desired currently requirements.

And then, in step 730, the controller controls the selected electrical conversion modules and switches of the matrix to selectively provide and/or receive electricity to the one or more terminals. The controller can utilize a rule-based routine to determine the number and types of ECMs required to meet a desired load or loads. In controlling the selected electrical conversion modules and one or more switches of the switch matrix, the controller may utilize a look-up table (in memory) which maps the terminals to the electrical conversion modules and the switches. The method may return to step 710 for different power conversion requirements, or simply end.

Figure 8:
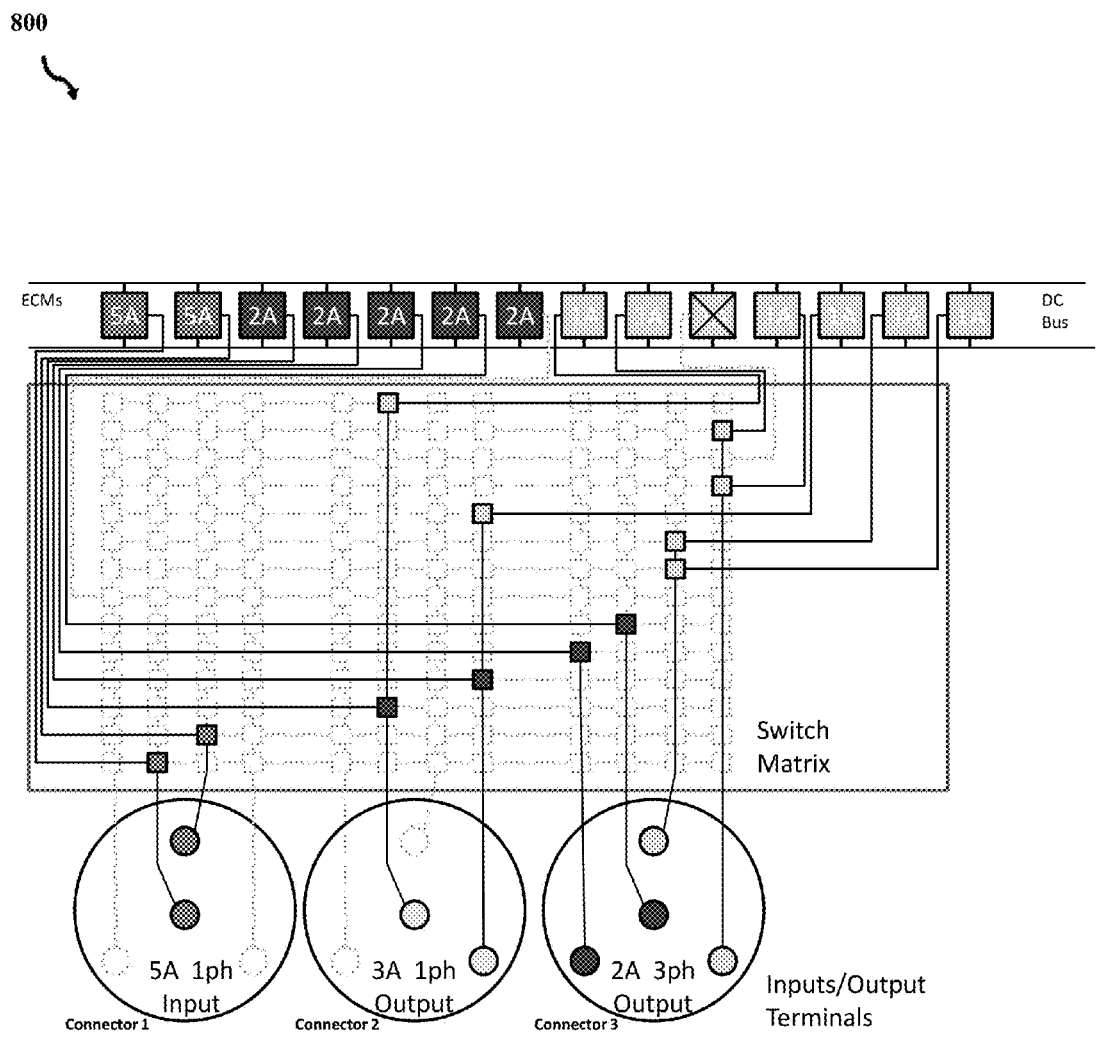
FIG. 8 shows a configuration of the power supply and/or power converter illustrated in FIG. 3 used in an exemplary power conversions.

FIG. 8 shows a configuration 800 of the power converter 300 illustrated in FIG. 3 used in an exemplary power conversions. The bus 20 may be configured as a DC line having a 600V neutral return center terminal. The ECMs may all be Half H-bridge ECMs 30A. A two rail DC power 20 bus is used. Connectors #1, #2, and #3 use the universal connector structure of FIG. 1B.

Input power comes from Connector #1. It provides 5 A 600V DC power. Thus only two terminals on connector #1 are used. Connectors #2 and #3 are used for providing two load outputs. The load at Connector #2 requires 3 A, 1-phase, 120V AC at 60 Hz. (This is standard household power). And, the load at Connector #3 requires a maximum of 2 A, 3-phase, 240V AC at 60 Hz. (This power can be used to power a large motor). The figure depicts the ECMs 30 and switches of matrix 40 which are selected to provide the required output loads at Connectors #2 and #3 from the power input at Connector #1. The 'X' in this figure depicts an unused ECM.

To achieve the desired power requirements, the power converter 300 is configured and operated by controller 60. More particularly, the switch matrix turns 'ON' two switches in the switch matrix 40 connecting two terminals (1 and 2) of Connector #1 to two 5 A-rated ECMs. The corresponding terminals, switches and ECMs are depicted in the same shade of gray corresponding to a current ratings of 5 A. The selected 5 A-rated ECMs are controlled to simple connect the input power from Connector #1 to the power bus 20 by turning 'ON' the ECMs' switches, i.e., operating at a duty cycle of 100%, for DC-to-DC conversion. One 5 A-rated ECM supplies 0 V from terminal 1 of Connector #1 to a first rail of the bus, and the other 5 A-rated ECM supplies 600V from terminal 2 of Connector #1 to the second rail of the bus. This supplies the power bus 20 with 600V DC power, 5 A-rated.

Connectors #2 and #3 both require AC power, but having different requirements. For Connector #2, which requires single phase AC power, terminals (1 and 3) are used. Since the 5 A-ECMs are already being used for supplying the input power from Connector #1 to the bus 20, a 2 A-rated and 1 A-rated ECMs are selected by the controller for both of these terminals. Again, the sum of the selected ECMs must meet or exceed the required current. The corresponding terminals, switches and ECMs are depicted in the same shade of gray corresponding to current ratings of 2 A and 1 A. The controller 60 operates the four ECMs (two 2 A-rated, and two 1 A-rated) here to take 600V DC from the bus 20 and to output 3 A, 1-phase, 120V AC power to Connector #2. To this end, controller 60 employs a DC-to-AC PWM control strategy for controlling the various ECMs' switches to produce 120 VAC at 60 Hz. Single phase AC power does not require any phase shift; thus all four ECMs here can all receive the same control signals from the controller.

Connector #3 requires 3-phase AC power. Thus, terminals (1-4) are used. The controller selected a 2-A rated ECM for both terminals 1 and 4, and two 1-A rated ECMs for both terminals 2 and 3. (Alternatively, the remaining 2 A-rated ECM could have been used in lieu of the two 1-A rated ECMs for one of these terminals). The corresponding terminals, switches and ECMs are depicted in the same shade of gray corresponding to current ratings of 2 A and 1 A.

The controller 60 operates the six ECMs (two 2 A-rated, and four 1 A-rated) here to take 600V DC from the bus 20 and to output 2 A, 3-phase, 240V AC power to Connector #3. A DC-to-AC PWM control strategy for controlling the various ECMs' switches to produce 240 VAC at 60 Hz. However, since 3-phase power is required, the power signal to terminals 2, 3 and 4 are be phased shifted by 120° from one another. The two 1 A-rated ECMs connected to terminal 2 operate at 0°, the two 1 A-rated ECMs connected to terminal 3 operate at 120°, and the 2 A-rated ECM connected to terminal 4 operates at 240°

Figure 9A:
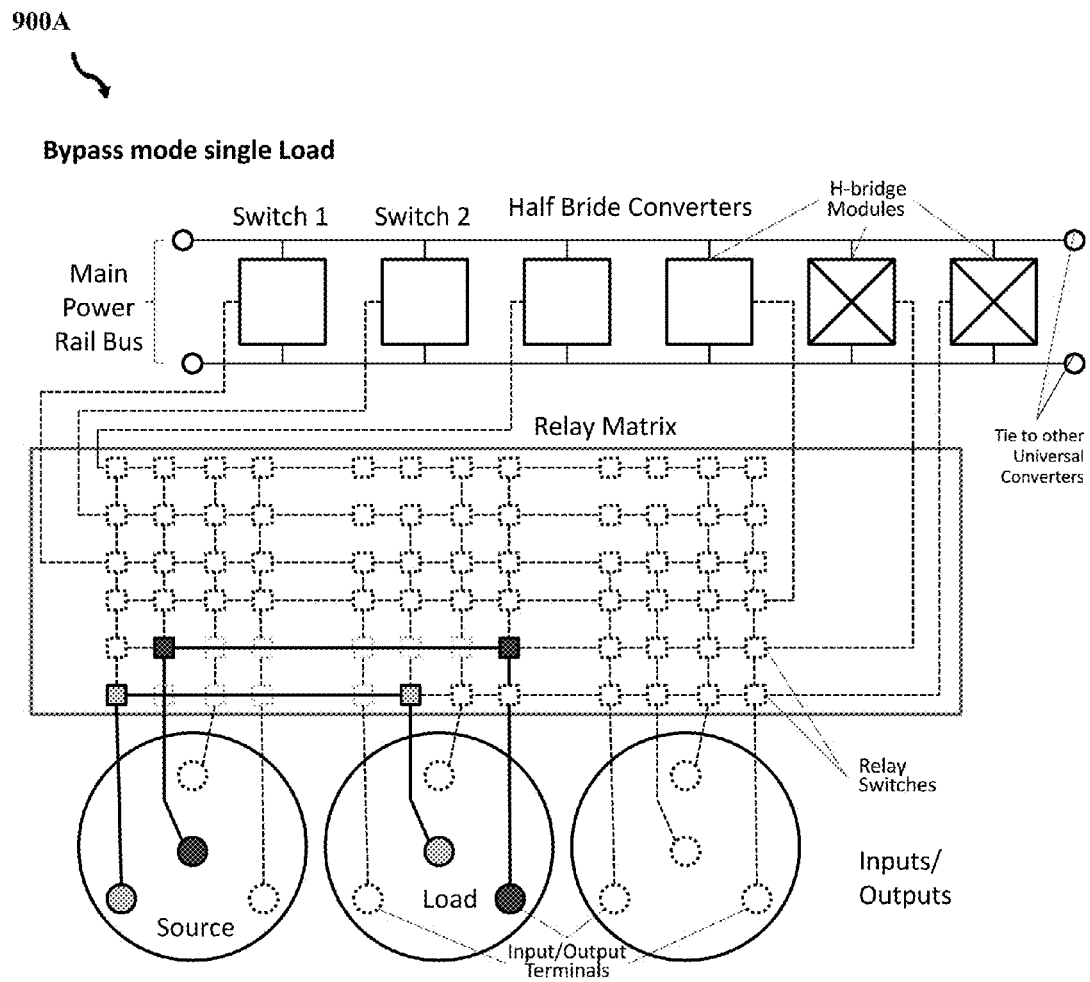
FIGS. 9A and 9B show exemplary "bypass mode" configurations of the the power supply and/or power converter illustrated in FIG. 2 according to embodiments.
Figure 9B:
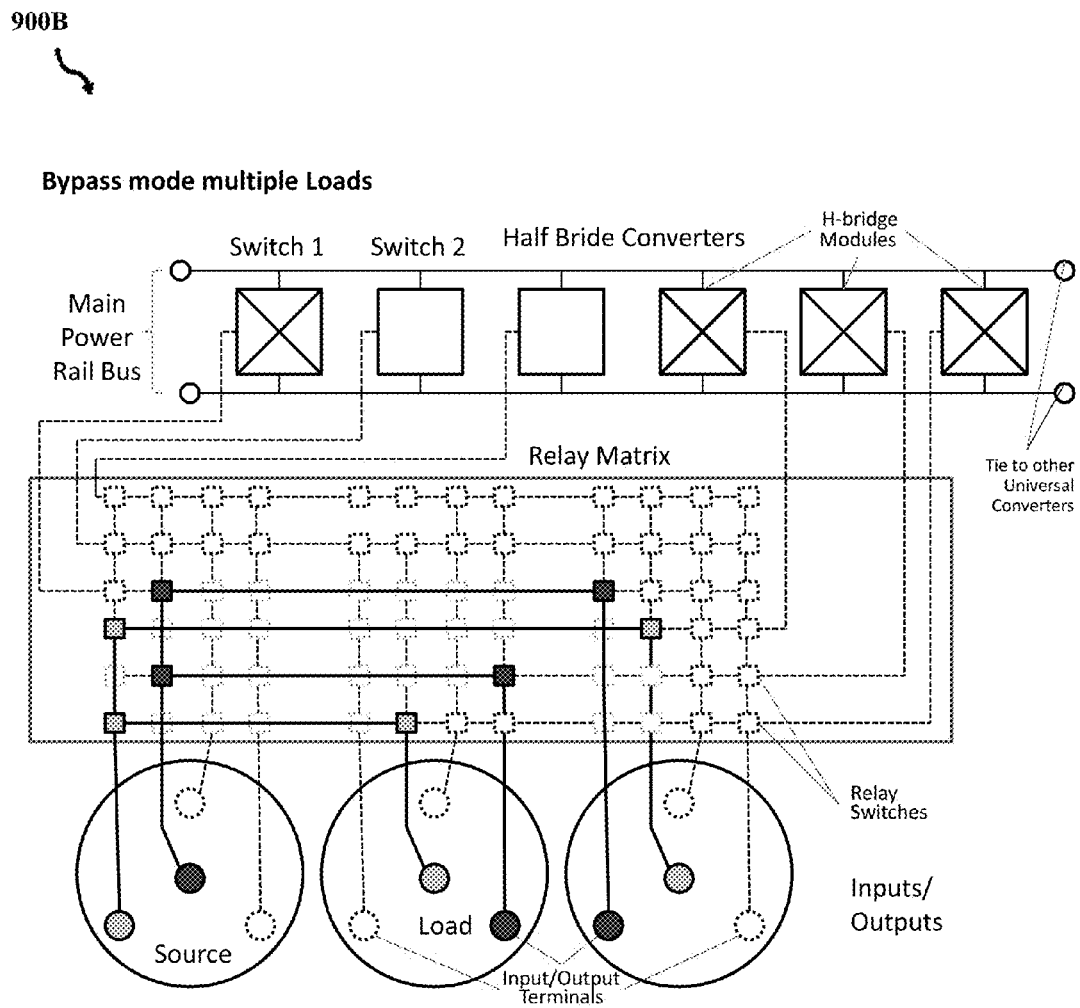

FIGS. 9A and 9B show exemplary "bypass mode" configurations of the converter illustrated in FIG. 2. The switch matrix allows the system to run in a bypass mode if the output power requirements for voltage, phase and frequency are identical to those demanded by the load. FIG. 9A shows a bypass configuration 900A for a single load. The Connectors #1, #2, and #3 in these figures use the universal connector structure of FIG. 1B and are used for single phase AC power. It may be advantageous for some applications to reverse the polarity of the power from the Source to the Load. Thus, terminal 1 of Connector #1 is swapped with terminal 3 of Connector #2, and terminal 4 of Connector #1 is swapped with terminal 1 of Connector #2. The controller 60 can affect this polarity swapping between the connectors by controlling the switch matrix 40 alone. In this situation, the switch connecting the source to the converter is closed, i.e., turned 'ON" and the corresponding switch connected to the load is also closed allowing the power to bypass the ECMs and power conversions. When running in this mode the ECMs that are connected to the switches in the matrix being used are kept open and unavailable for other uses (as depicted with an 'X'). FIG. 9B shows a bypass configuration 900B for multiple loads. The operation is very similar to what is shown in FIG. 9A with an additional load. The terminals and switches involved in this bypass operation for swapping the terminals in FIGS. 9A and 9B are depicted in the corresponding shades of gray corresponding.

In some cases, additional switches S may be necessary to provide higher current pass through utilizing parallel pathways through the matrix 40. For example, the matrix switches S have current ratings like the ECMs. If, for instance, the switches S may each have a 1 A-rating, but 2 A of current may be needed at a load, then two or more switches S in those matrix columns could be utilized; this would be at the expense of another ECM though.

The converter configurations provide scalability allowing multiple systems to be combined providing additional input/output terminals and high power conversion. This capability is enabled by connecting the bus 20 of one converter 100 to the bus 20 of another converter 100. This allows the converters to be connected in many possible topologies. Thus, a modular and scalable power converter system can be formed of a plurality of the power converters 100 being removably connected for power transfer between them.

Figure 10:
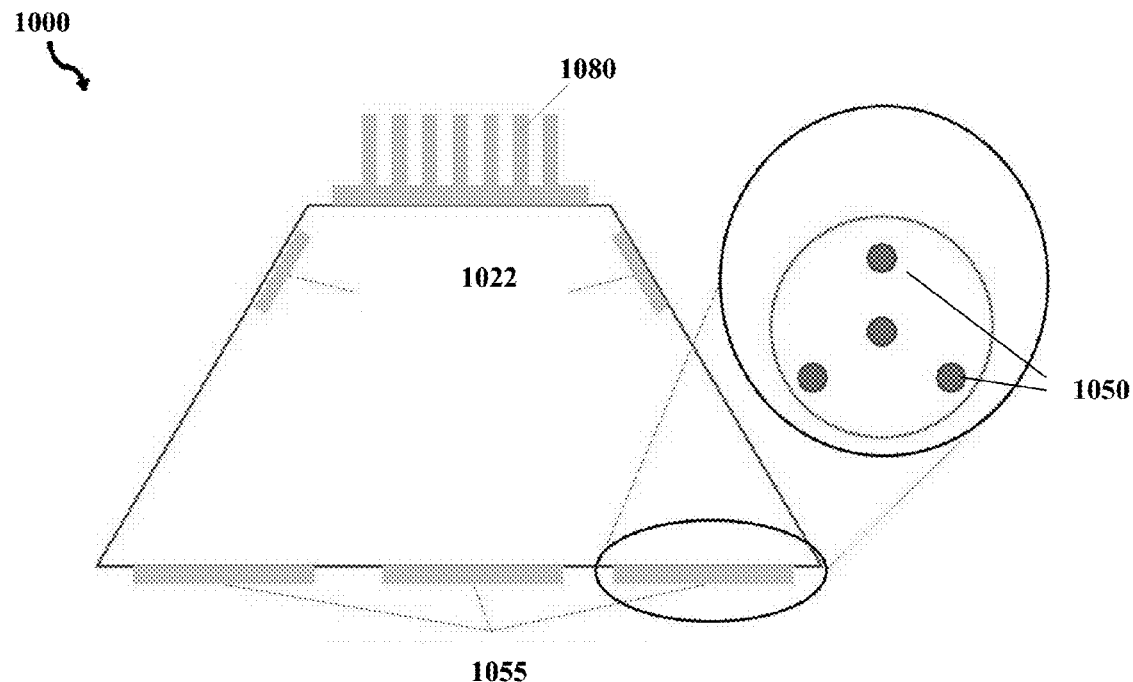
FIGS. 10, 10A and 10B show exemplary power supply and/or power converter systems forming a modular and scalable system according to embodiments.
Figure 10A:
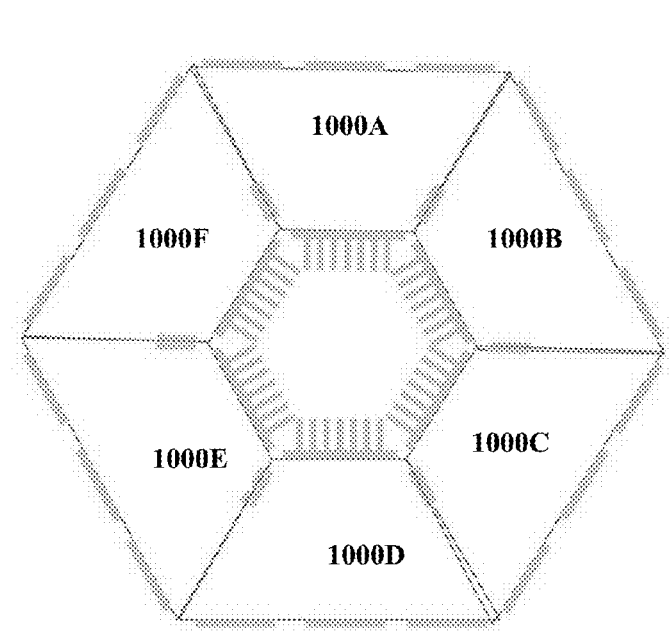
Figure 10B:
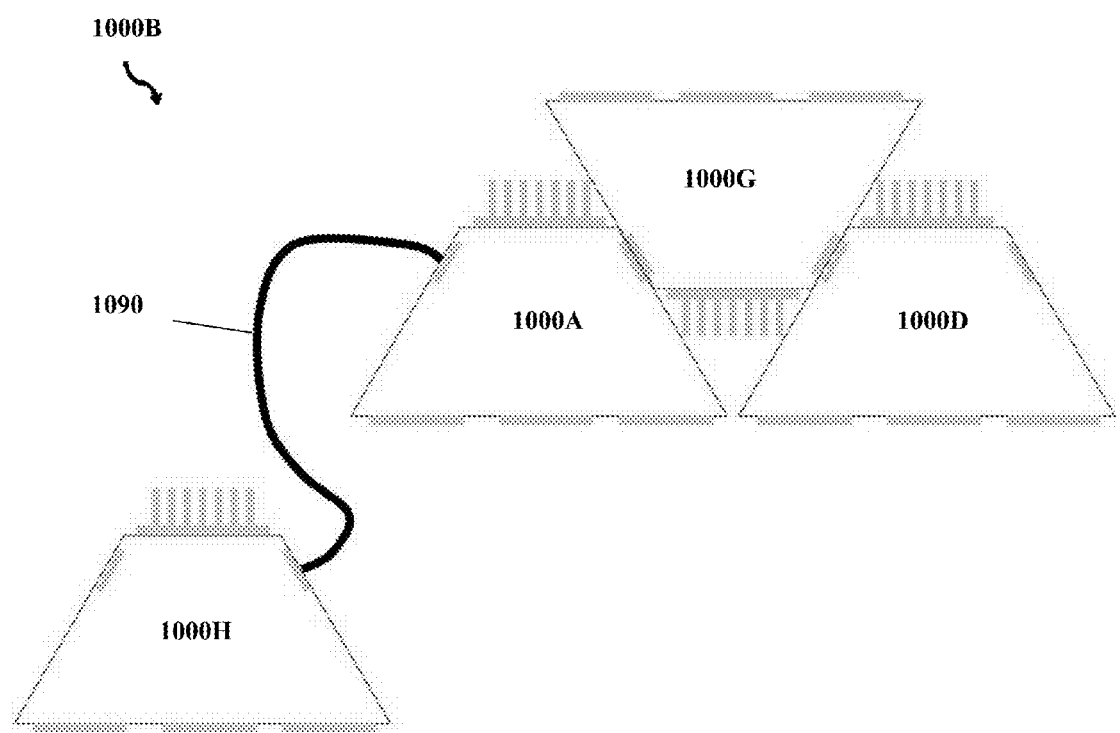

FIGS. 10, 10A and 10B show exemplary power supply and/or power converter systems according to embodiments forming modular and scalable power converter systems. FIG. 10 shows a side view of a power converter 1000 used in exemplary power converter systems. It can be configured as converter 100 having a hexagonal outer housing. Input/Output terminals 1050 may be located on the top and/or bottom of the converter 1000 and grouped as one or more connectors 1055. The bus (not shown) of the converter 1000 may include connections 1022 for electrically coupling with another converter 1000. Connection 1022 may be plug connections 1022, for instance. To reduce heating one or more heat sinks 1080 may be located on the housing.

FIG. 10A shows a top view of a ring topology 1000A of six power converters 1000 of a modular and scalable power converter system according to an embodiment. Here, power converters 1000A-1000F are shown connected together. Assuming each of the power converters 1000 is configured to handle 20 kW, a ring of six power converters 1000 can provide up to 120 kW of total power conversion.

In other embodiments, the power converters 1000 might be configured for linear or other topologies. For instance, a converter 1000G may be flipped over and connected to converters 1000A and 1000D forming ring topology 1000B shown in FIG. 10C. And additional converter 1000H can be connector (or 'daisy-chained') to converter 1000A with a wire or other conductor 1090. A (master) controller, similar to controller 60, of the connected converters determines which and how many of the ECMs and which matrix switches for the various power converters of the system would be used for a given output. The limiting factor on the number of converters in a given configurations is the current handling limit of the bus. Additionally communications between converters might also be required to ensure proper control across the entire system is maintained.

The innovative power supply and/or power conversion systems advantageously provide "plug-and-play" power distribution in emergency situations, commercial power conversion for off-grid operations, and universal power conversion for construction sites and other operations that have power. Also they may reduce or eliminate the need for many specialty converters that can only provide a single voltage, current, frequency and phase.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

I claim:

1. A power supply and/or power converter comprising:
   a power bus;
   a plurality of terminals for input and/or output of electricity;
   a plurality of electrical conversion modules connected in parallel to the bus for transferring or converting electricity, wherein the electrical conversion modules each comprise a single half-H bridge circuit or a single full-H-bridge circuit;
   a switch matrix, formed of a plurality of switches arranged in an array, connecting to the plurality of electrical conversion modules and the plurality of terminals; and
   a controller configured to select and operate one or more electrical conversion modules and one or more switches of the switch matrix to selectively provide and/or receive electricity to the one or more terminals,
   wherein one or more of the electrical conversion modules are reconfigurably connected, via the switch matrix, to provide:
   (a) DC-to-AC conversion;
   (b) DC-to-DC conversion;
   (c) AC-to-DC conversion; and
   (d) AC-to-AC conversion.

2. The power supply and/or power converter of claim 1, wherein the one or more of the electrical conversion modules are hardwired or removably connected to the bus.

3. The power supply and/or power converter of claim 1, wherein, for DC-to-AC conversion, the selected one or more electrical conversion modules are configured as an inverter circuit for receiving DC power and outputting AC power.

4. The power supply and/or power converter of claim 3, wherein the voltage, frequency and phase of the one or more selected electrical conversion modules are controlled by the controller which generates control signals to the selected electrical conversion modules using a DC-to-AC-pulse-width modulation (PWM) control technique.

5. The power supply and/or power converter of claim 4, wherein the PWM control signals are phased shifted based on the number of phases of power required.

6. The power supply and/or power converter of claim 1, wherein, for DC-to-DC conversion, one or more of the electrical conversion modules are configured as a buck converter and/or a boost converter for transferring DC power between the bus and one or more terminals.

7. The power supply and/or power converter of claim 6, wherein the selected electrical conversion modules are controlled by the controller which generates control signals to the selected electrical conversion modules using an DC-to-DC-pulse-width modulation (PWM) control technique.

8. The power supply and/or power converter of claim 1, wherein, for AC-to-DC conversion, one or more of the electrical conversion modules are configured as a rectifier circuit for receiving AC power and outputting DC power.

9. The power supply and/or power converter of claim 8, wherein the selected electrical conversion modules are controlled by the controller which generates control signals to the selected electrical conversion modules using an AC-to-DC-pulse-width modulation (PWM) control technique.

10. The power supply and/or power converter of claim 1, wherein, for AC-to-AC conversion, one or more of the electrical conversion modules are configured as a rectifier circuit for receiving AC power and outputting DC power to the bus, and one or more of the electrical conversion modules are configured as an inverter circuit for receiving DC power from the DC bus and outputting AC power.

11. The power supply and/or power converter of claim 1, wherein the converter is configured to operate in a bypass mode to directly shunt power through the matrix switch between terminals or connectors while avoiding the use of any electrical conversion modules.

12. The power supply and/or power converter of claim 1, wherein there are multiple electrical conversion modules provided having multiple, different current ratings.

13. The power supply and/or power converter of claim 1, wherein the controller selects one or more electrical conversion modules such that their current ratings sum to at least the required current requirement.

14. The power supply and/or power converter of claim 1, wherein the electrical conversion modules connect to rows of the switches in the switch matrix, and the terminals connect to columns of the switches in the switch matrix.

15. The power supply and/or power converter of claim 14, wherein each of the electrical conversion modules connects to a different one, of the rows of the switches in the switch matrix, and each of the terminals connects to a different one, of the columns of the switches in the switch matrix.

16. The power supply and/or power converter of claim 1, wherein the switch matrix formed of a plurality of switches are arranged in an interconnected, array, each switch being orthogonally connected to neighboring switches, above and below and side to side, where present, in the switch matrix.

17. The power supply and/or power converter of claim 1, further comprising a power supply connected to the bus for supplying power to the bus.

18. The power supply and/or power converter of claim 1, wherein the bus is configured for DC power.

19. The power supply and/or power converter of claim 1, wherein the controller is configured to:
determine information for requirements of voltage, frequency, phase, current, or some combination thereof for desired power;
select which electrical conversion modules to be used for the desired power; and
control the selected electrical conversion modules and one or more switches of the matrix to selectively provide and/or receive electricity to the one or more terminals.

20. The power supply and/or power converter of claim 19, wherein, in determining information for requirements of for power, the controller determines the requirements based on:
(a) the load;
(b) user-input; and/or
(c) pre-determined input and/or output power.

21. The power supply and/or power converter of claim 19, wherein, in selecting which electrical conversion modules to be used for said power, the controller utilizes a rule-based routine.

22. The power supply and/or power converter of claim 19, wherein, in controlling the selected electrical conversion modules and one or more switches of the switch matrix, the controller utilizes a look-up table which maps the terminals to the electrical conversion modules and the switches.

23. A modular and scalable power supply and/or power converter system comprising:
a plurality of power supplies and/or power converters of claim 1 being electrically being configured to be removably connected for power transfer between them.

24. The system of claim 23, wherein the plurality of the power supplies and/or power converters are configured to be connected in a ring or linear topology.

25. The system of claim 23, wherein at least two of the plurality of the power supplies and/or power converters and configured to be remotely connected with a wire; and/or to connected to one another via plugs or connectors between them.

26. The power supply and/or power converter of claim 1, wherein various pulse-width modulation (PWM) control techniques are used to control one or more of the electrical conversion modules and switching to provide the power conversions (a), (b), (c) and (d).

27. A power supply and/or power converter comprising:
a power bus;
a universal connector having a plurality of terminals in which combinations or sub-combinations of one or more terminals are configurable for input and/or output of different types of electricity;
a plurality of electrical conversion modules connected in parallel to the bus for transferring or converting electricity;
a switch matrix, formed of a plurality of switches arranged in an array, connecting to the plurality of electrical conversion modules and the plurality of terminals; and
a controller configured to select and operate one or more electrical conversion modules and one or more switches of the switch matrix to selectively provide and/or receive electricity to the one or more terminals,
wherein the switch matrix selectively connects to different combinations or sub-combinations of one or more of the plurality of terminals of the universal connector for input and/or output of different types of electricity.

28. The power supply and/or power converter of claim 27, wherein one or more of the plurality of terminals of the universal connector are configurable for input and/or output of DC, single-phase AC, two-phase AC and three-phase AC types of electricity.

29. The power supply and/or power converter of claim 13, wherein the more than one electrical conversion modules are selected and operated just out of phase or time so that ripples are reduced when AC current is summed.

* * * * *